(12) United States Patent
Shi et al.

(10) Patent No.: US 10,681,115 B2
(45) Date of Patent: Jun. 9, 2020

(54) MULTIMEDIA DATA TRANSMISSION METHOD AND DEVICE

(71) Applicant: Hangzhou Hikvision Digital Technology Co., Ltd., Hangzhou, Zhejiang (CN)

(72) Inventors: Wanfeng Shi, Zhejiang (CN); Shengna Lin, Zhejiang (CN); Qiang Yu, Zhejiang (CN)

(73) Assignee: Hangzhou Hikvision Digital Technology Co, Ltd. (CN)

( * ) Notice: Subject to any disclaimer, the term of this patent is extended or adjusted under 35 U.S.C. 154(b) by 53 days.

(21) Appl. No.: 16/069,115

(22) PCT Filed: May 25, 2016

(86) PCT No.: PCT/CN2016/083301
§ 371 (c)(1),
(2) Date: Jul. 10, 2018

(87) PCT Pub. No.: WO2017/121059
PCT Pub. Date: Jul. 20, 2017

(65) Prior Publication Data
US 2019/0007479 A1 Jan. 3, 2019

(30) Foreign Application Priority Data

May 25, 2016 (CN) .......................... 2016 1 0020662

(51) Int. Cl.
*H04L 29/08* (2006.01)
*H04W 4/44* (2018.01)
(Continued)

(52) U.S. Cl.
CPC .............. *H04L 67/06* (2013.01); *H04L 29/08* (2013.01); *H04L 63/02* (2013.01); *H04W 4/20* (2013.01); *H04W 4/44* (2018.02)

(58) Field of Classification Search
CPC ......... H04L 67/06; H04L 29/08; H04L 63/02; H04W 4/44; H04W 4/20
See application file for complete search history.

(56) References Cited

U.S. PATENT DOCUMENTS 7,103,619 B1 * 9/2006 Rajpurkar ............. G06F 16/273
8,397,024 B2 * 3/2013 Fasoli ................. G06F 12/0246
711/103
(Continued)

FOREIGN PATENT DOCUMENTS

CN 202534165 U 11/2012
CN 103198657 A 7/2013
(Continued)

OTHER PUBLICATIONS

International Search Report dated Oct. 10, 2016, issued in connection with International Application No. PCT/CN2016/083301, dated May 25, 2016, 2 pages.

Primary Examiner — John A Follansbee
Assistant Examiner — Fadi Haj Said
(74) Attorney, Agent, or Firm — McDonnell Boehnen Hulbert & Berghoff LLP

(57) ABSTRACT

The present application provides a multimedia data transmission method and device, wherein the method comprises: a first transmission device located in a first network obtaining a multimedia file descriptor and a multimedia file to be transmitted which have a correspondence, wherein the multimedia file descriptor and the multimedia file are stored in different memories; the first transmission device encoding content of the multimedia file descriptor and content of the multimedia file into a multimedia transmission file in a first format according to a predetermined rule; the first transmission device sending the multimedia transmission file to a second transmission located in a second network. With the present application, the problem that multimedia data cannot (Continued)

be transmitted synchronously during ferrying in related arts is solved and the security and confidentiality of multimedia data transmission is ensured while the multimedia data is transmitted synchronously.

19 Claims, 5 Drawing Sheets

(51) Int. Cl.
*H04W 4/20* (2018.01)
*H04L 29/06* (2006.01)

(56) References Cited

U.S. PATENT DOCUMENTS

| | | | | |
|---|---|---|---|---|
| 9,305,551 | B1* | 4/2016 | Johns | G16H 15/00 |
| 9,646,023 | B1* | 5/2017 | McCabe | G06F 16/1844 |
| 9,953,070 | B1* | 4/2018 | Hankins | G06F 21/6245 |
| 10,296,375 | B1* | 5/2019 | Goleshchikhin | G06F 9/4856 |
| 2004/0128361 | A1* | 7/2004 | Gaffney | H04L 29/06 |
| | | | | 709/217 |
| 2008/0222111 | A1* | 9/2008 | Hoang | G06F 16/21 |
| 2010/0125586 | A1* | 5/2010 | Van Vleck | H04L 67/06 |
| | | | | 707/748 |
| 2013/0141572 | A1* | 6/2013 | Torres | H04N 7/185 |
| | | | | 348/143 |
| 2013/0258192 | A1* | 10/2013 | Fukuda | H04N 7/00 |
| | | | | 348/474 |
| 2015/0355965 | A1* | 12/2015 | Peddle | G06F 13/28 |
| | | | | 714/773 |
| 2016/0164923 | A1* | 6/2016 | Dawes | H04L 65/4084 |
| | | | | 709/227 |
| 2016/0259888 | A1* | 9/2016 | Liu | G06F 19/321 |
| 2016/0345035 | A1* | 11/2016 | Han | H04N 21/23424 |
| 2016/0357451 | A1* | 12/2016 | Chen | G06F 3/0611 |
| 2016/0364678 | A1* | 12/2016 | Cao | G06Q 50/30 |
| 2017/0041319 | A1* | 2/2017 | Barrett | G06F 21/64 |
| 2017/0103267 | A1* | 4/2017 | Mishra | G06K 9/6254 |
| 2017/0123069 | A1* | 5/2017 | Kotab | H04W 4/14 |
| 2018/0309991 | A1* | 10/2018 | Thiagarajan | H04N 19/124 |
| 2019/0026277 | A1* | 1/2019 | Doyle | G11B 27/031 |
| 2019/0058929 | A1* | 2/2019 | Young | H04N 21/8547 |
| 2019/0246070 | A1* | 8/2019 | Paliga | G07F 19/207 |
| 2019/0259396 | A1* | 8/2019 | Wuebbolt | G10L 19/008 |

FOREIGN PATENT DOCUMENTS

| | | | |
|---|---|---|---|
| CN | 203812397 U | | 9/2014 |
| CN | 104750808 A | | 7/2015 |
| CN | 105185121 A | | 12/2015 |
| CN | 105677240 A | * | 12/2015 |
| EP | 1 324 274 A2 | | 7/2003 |

* cited by examiner

MULTIMEDIA DATA TRANSMISSION METHOD AND DEVICE

The present application is a US national phase under 35 U.S.C. § 371 of international application PCT/CN2016/083301, filed May 25, 2016, which claims the priority to Chinese Patent Application No. 201610020662.4, filed with the State Intellectual Property Office of People's Republic of China on Jan. 13, 2016 and entitled "Multimedia data transmission method and device", which is incorporated herein by reference in their entirety.

TECHNICAL FIELD

The present application relates to the communication field, and particularly to a multimedia data transmission method and device.

BACKGROUND

Nowadays, in order to monitor passing vehicles, a vehicle monitoring system often provides image capture components at different inspection spots to achieve the purpose of monitoring the passing vehicles in real time by transmitting the data of passing vehicles captured by the image capture components to a private network via a video network. However, due to the sensitivity of the internal network of the private network, a complex security border is often added between the private network and the video network to ensure that various manufacturers cannot transmit data and pictures of passing vehicle according to private protocols of their own. Currently, a dual-network and dual-platform solution often used by various manufacturers is as follows.

As shown in FIG. 1, the whole monitoring and transmission system includes two sets of platforms which are disposed in a video network 102 and in private network 106 respectively. Front end database servers 110 and FTP picture manage servers 112 are disposed at the borders close to the video network 102 and the private network 106 respectively. The data of passing vehicles in the video network 102 is written into the front end database server 110 of the video network 102 by a data exporting service and corresponding pictures are downloaded from a picture manage server (PMS) and stored in the FTP server 112. The data of passing vehicles is synchronized to the front end database server 110 of the private network 106 by ferrying through the border, meanwhile, the pictures are synchronized to the FTP server 112 of the private network 106. The pictures of passing vehicles are polled and read through a data importing service within the private network, part of the data of passing vehicles is obtained by analyzing picture names, and corresponding data of passing vehicles is read in the front end database server 110 of the private network according to this part of information, forms valid data of passing vehicles and is uploaded to the platform and at the same time the pictures are uploaded to the PMS. Alternatively, the data of passing vehicles in the database is firstly obtained and the pictures are found according to the data of passing vehicles. Here, ferrying refers to importing files of the video network 102 into the private network 106 through border (a third party platform).

However, with the existing multimedia data transmission methods, there is always a problem that pictures are already present in the private network but corresponding data of passing vehicles is still absent in the front end database server, or the data of passing vehicles are present but corresponding pictures are absent in the private network. That is, data cannot be transmitted synchronously in the existing multimedia data transmission methods. Further, since data is provided directly to a third party platform (e.g. the border) for transmission and the transmitted data can be viewed directly by the third party platform, security and confidentiality of data transmission is reduced.

SUMMARY

Embodiments of the present application provide a multimedia data transmission method and device to solve at least the problem present in the multimedia data transmission methods in related arts that data cannot be transmitted synchronously.

According to an aspect of embodiments of the present application, a multimedia data transmission method is provided, which includes: a first transmission device located in a first network obtaining a multimedia file descriptor and a multimedia file to be transmitted which have a correspondence, wherein the multimedia file descriptor and the multimedia file are stored in different memories; the above first transmission device encoding content of the multimedia file descriptor and content of the multimedia file into a multimedia transmission file in a first format according to a predetermined rule; the first transmission device sending the multimedia transmission file to a second transmission device located in a second network.

Optionally, the first transmission device located in the first network obtaining the multimedia file descriptor and the multimedia file to be transmitted which have a correspondence includes: the first transmission device obtaining the multimedia file descriptor from the head of a transmission queue provided in the first transmission device; the first transmission device obtaining the multimedia file from a device in which the multimedia file is stored, which device is indicated by the multimedia file address in the obtained multimedia file descriptor.

Optionally, before the first transmission device obtains the multimedia file descriptor from the head of the transmission queue provided in the first transmission device, the method further includes: the first transmission device importing the multimedia file descriptor obtained in real time into a temporary data table; the first transmission device obtaining a latest multimedia file descriptor from the temporary data table; the first transmission device inserting the obtained latest multimedia file descriptor into the head of the transmission queue.

Optionally, the first transmission device sending the multimedia transmission file to the second transmission device located in the second network includes: the first transmission device sending the multimedia transmission file to the second transmission device located in the second network through a third party ferrying device; or the first transmission device sending the multimedia transmission file to the second transmission device through a firewall device; wherein, the third party ferrying device or the firewall device is used to provide a security border between the first network and the second network.

Optionally, after the first transmission device sends the multimedia transmission file to the second transmission device located in the second network, the method further includes: if the first transmission device does not receive a response message sent by the second transmission device within a predetermined time period indicating successful reception of the multimedia transmission file, or if the first transmission device receives a response message sent by the second transmission device within a predetermined time period indicating failure in receiving the multimedia transmission file, then the first transmission device inserting the multimedia file descriptor to the end of the transmission queue; or before the first transmission device sends the multimedia transmission file to the second transmission device located in the second network, the method further includes: if the first transmission device fails to obtain the multimedia file, then the first transmission device inserting the multimedia file descriptor to the end of the transmission queue.

Optionally, the multimedia file descriptor includes monitoring identification data; the multimedia file includes an identification picture via monitoring.

According to another aspect of the embodiments of the present application, a multimedia data transmission method is provided, the method including: a second transmission device located in a second network receiving a multimedia transmission file in a first format sent by a first transmission device located in a first network, wherein the multimedia transmission file is obtained by encoding, according to a predetermined rule, a multimedia file descriptor and a multimedia file which have a correspondence; the second transmission device resolving the multimedia transmission file according to a predetermined rule to obtain the multimedia file descriptor and the multimedia file and uploading the multimedia file descriptor and the multimedia file to different memories respectively.

Optionally, the second transmission device located in the second network receiving the multimedia transmission file in the first format sent by the first transmission device located in the first network includes: after receiving the multimedia transmission file sent by the first transmission device, the second transmission device storing the multimedia transmission file into a local shared folder.

Optionally, the second transmission device located in the second network receiving the multimedia transmission file in the first format sent by the first transmission device located in the first network further includes: after it is found out that a new multimedia transmission file is stored in the shared folder, the second transmission device obtaining the newly stored multimedia transmission file from the shared folder and storing it into an intermediate folder located locally.

Optionally, the second transmission device resolving the multimedia transmission file according to the predetermined rule to obtain the multimedia file descriptor and the multimedia file and uploading the multimedia file descriptor and the multimedia file to different memories respectively includes: the second transmission device obtaining the multimedia transmission file from the shared folder or the intermediate folder and resolving the multimedia transmission file according to the predetermined rule to obtain the multimedia file descriptor and the multimedia file; the second transmission device storing the multimedia file descriptor to an uploading queue and a first database located locally; the second transmission device obtaining the multimedia file descriptor from the uploading queue and obtaining the corresponding multimedia file according to this multimedia file descriptor; the second transmission device uploading the multimedia file descriptor and the multimedia file to different memories respectively; or the second transmission device obtaining the multimedia transmission file from the shared folder or the intermediate folder; the second transmission device storing the multimedia transmission file to an uploading queue located locally; the second transmission device obtaining the multimedia transmission file from the uploading queue and resolving the multimedia transmission file according to the predetermined rule to obtain the multimedia file descriptor and the multimedia file; the second transmission device storing the multimedia file descriptor into a first data base located locally; the second transmission device uploading the multimedia file descriptor and the multimedia file to different memories respectively.

Optionally, the method further includes: if the second transmission device uploads the multimedia file descriptor and the multimedia file successfully, then setting the state identifier of the multimedia file descriptor in the first database as a success state; if the second transmission device fails to upload the multimedia file descriptor or the multimedia file, then setting the state identifier of the multimedia file descriptor in the first database as a failure state.

Optionally, the method further includes: inquiring whether there is a multimedia file descriptor with a failure state identifier in the first database; if so, then the second transmission device obtaining the multimedia file descriptor with a failure state identifier, and/or obtaining the multimedia file corresponding to the multimedia file descriptor and re-uploading the multimedia file descriptor and/or the multimedia file which have been uploaded unsuccessfully.

Optionally, the second transmission device obtaining the multimedia file descriptor with a failure state identifier, and/or obtaining the multimedia file corresponding to the multimedia file descriptor and re-uploading the multimedia file descriptor and/or the multimedia file which have been uploaded unsuccessfully includes: the second transmission device obtaining the multimedia file descriptor from the first database; and/or the second transmission device obtaining multimedia file corresponding to the multimedia file descriptor from the shared folder or the intermediate folder; the second transmission device inserting the obtained multimedia file descriptor and/or multimedia file to the end of the uploading queue; the second transmission device re-uploading the multimedia file descriptor and/or multimedia file to corresponding memories when the position of the multimedia file descriptor and/or multimedia file changes from the end to the head of the uploading queue.

Optionally, time interval between two adjacent re-uploads for the same multimedia file descriptor and/or multimedia file is in the form of nonlinear growth.

Optionally, the method further includes: inquiring whether there is a multimedia file descriptor with a success state identifier in the first database; if so, the second transmission device deleting the multimedia file descriptor with a success state identifier in the first database.

Optionally, the second transmission device deleting the multimedia file descriptor with a success state identifier in the first database includes: when the remaining storage capacity of the second transmission device is smaller than a first threshold and the current time is within a predetermined time period, the second transmission device deleting the multimedia file descriptor with a success state identifier in the first database until the current time is beyond the predetermined time period or until the remaining storage capacity is larger than a second threshold, wherein the second threshold is greater than the first threshold.

According to yet another aspect of the embodiments of the present application, a multimedia data transmission method is provided, the method including: a first transmission device located in a first network obtaining a multimedia file descriptor and a multimedia file to be transmitted which have a correspondence, wherein the multimedia file descriptor and the multimedia file are stored in different memories; the first transmission device encoding content of the multimedia file descriptor and content of the multimedia file into a multimedia transmission file in a first format according to a predetermined rule; the first transmission device sending the multimedia transmission file to a second transmission device located in a second network; the second transmission device located in the second network receiving the multimedia transmission file in the first format sent by the first transmission device located in the first network, wherein the multimedia transmission file is obtained by encoding, according to a predetermined rule, the multimedia file descriptor and the multimedia file which have a correspondence; the second transmission device resolving the multimedia transmission file to obtain the multimedia file descriptor and the multimedia file according to the predetermined rule and uploading the multimedia file descriptor and the multimedia file to different memories respectively.

According to yet another aspect of the embodiments of the present application, a multimedia data transmission device is provided, which is located in a first network and includes: an obtaining unit used for obtaining a multimedia file descriptor and a multimedia file to be transmitted which have a correspondence, wherein the multimedia file descriptor and the multimedia file are stored in different memories; an encoding unit used for encoding content of the multimedia file descriptor and content of the multimedia file into a multimedia transmission file in a first format according to a predetermined rule; a sending unit used for sending the multimedia transmission file to a second transmission device located in a second network.

According to yet another aspect of the embodiments of the present application, a multimedia data transmission device is provided, which is located in a second network and includes: a receiving unit used for receiving a multimedia transmission file in a first format sent by a first transmission device located in a first network, wherein the multimedia transmission file is obtained by encoding a multimedia file descriptor and a multimedia file which have a correspondence according to a predetermined rule; a resolving unit used for resolving the multimedia transmission file according to a predetermined rule to obtain the multimedia file descriptor and the multimedia file and uploading the multimedia file descriptor and the multimedia file to different memories respectively.

According to yet another aspect of the embodiments of the present application, an electronic apparatus is provided, including:

a processor, a memory, communication interfaces and a bus;

the processor, the memory and the communication interfaces connecting to and communicating with each other via the bus;

the memory being stored with executable program codes;

the processor executing a program corresponding to the executable program codes by reading the executable program codes stored in the memory for performing the above multimedia transmission methods.

According to yet another aspect of the embodiments of the present application, an application program is provided, which is used for performing the above multimedia transmission methods when executed.

According to yet another aspect of the embodiments of the present application, a storage medium is provided, which is used for storing an application program for performing the above multimedia transmission methods when executed.

With the embodiments of the present application, the first transmission device located in the first network obtains the multimedia file descriptor and the multimedia file which have a correspondence, wherein the multimedia file descriptor and the multimedia file are stored in different memories; the multimedia file descriptor and the multimedia file which have a correspondence are encoded into a multimedia transmission file in a first format according to a predetermined rule to overcome the problem of unsynchronized transmission due to separate transmission in related arts.

Further, the multimedia file descriptor and the multimedia file are converted according to the first format as agreed by both sides, wherein the first format is unknown to the third party platform, thereby avoiding the problem of multimedia data leakage resulting from the multimedia data being obtained by the third party platform and then ensuring the security and confidentiality of multimedia data transmission.

BRIEF DESCRIPTION OF THE DRAWINGS

In order to describe embodiments of the present application and technical solutions in prior arts more clearly, the drawings used in the embodiments and prior arts will be described briefly below. Apparently, the drawings described below are only for some embodiments of the present application, and one of ordinary skill in the art can also obtain other drawings according to these drawings without creative efforts.

DETAILED DESCRIPTION

Figure 1:
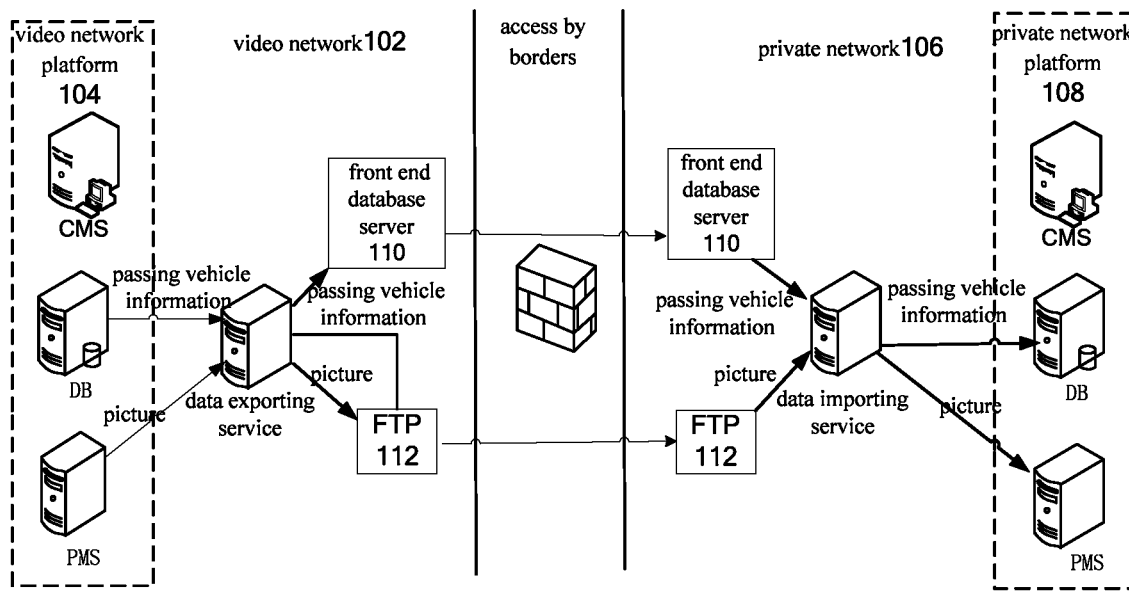
FIG. 1 is a schematic view of the application of a multimedia data transmission method in prior arts.

In order to make the objectives, technical solutions and advantages of the present application more clear, the present application will be further described in detail with reference to the drawings and embodiments below. Obviously, the described embodiments are only some embodiments of the present application, rather than all of the embodiments. Based on the embodiments in the present application, all of the other embodiments obtained by one of ordinary skill in the art without creative efforts will fall in the protection scope of the present application.

It is noted that the terms "first", "second" and the like in the description, claims and the above figures of the present application are used to distinguish similar objects and are not necessarily used for describing particular order or sequence. It should be understood that terms used in this way may be interchangeable in suitable situations such that the embodiments of the present application described herein can be implemented in the orders other than those illustrated or described herein. In addition, terms "include" and "have" as well as any form thereof are intended to cover an inclusive meaning. For example, the process, method, system, product or device including a series of steps or units are not necessarily limited to those steps or units set forth, but may include other steps or units that are not clearly set forth or that are inherent for those process, method, product or device.

Embodiment 1

According to the embodiments of the present application, an embodiment of a multimedia data transmission method is provided. It should be noted that the steps shown in the flowchart in the drawings may be executed for example in a computer system with a set of computer executable instructions. Although a logic sequence is shown in the flowchart, the steps shown or described may be executed in a different sequence in certain situations.

Figure 2:
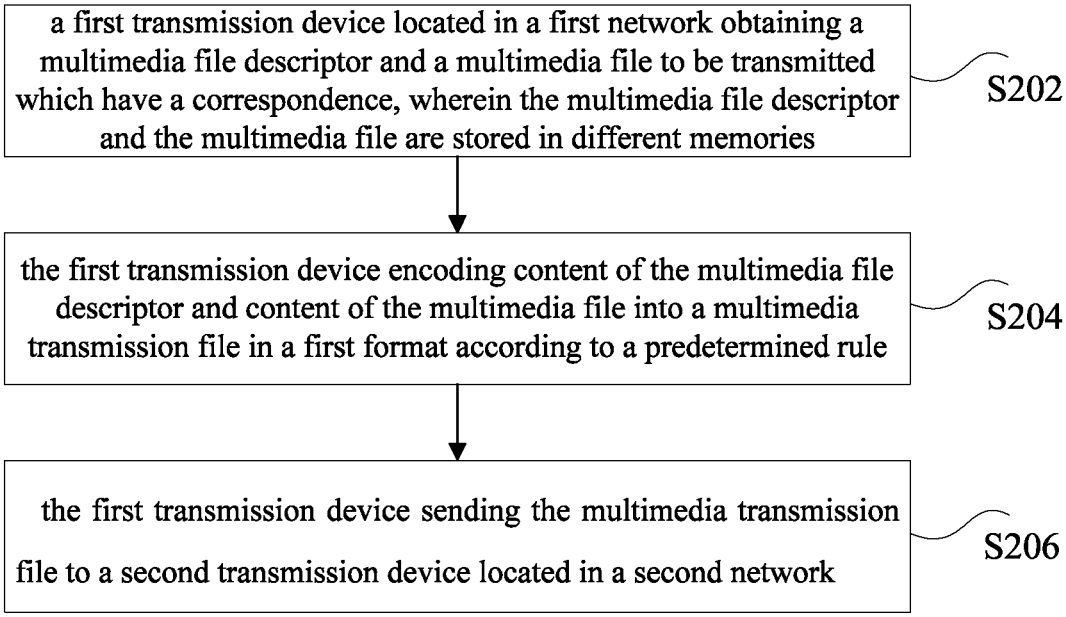
FIG. 2 is a flowchart of an optional multimedia data transmission method according to an embodiment of the present application.

According to an embodiment of the present application, a multimedia data transmission method is provided. As shown in FIG. 2, the method includes:

S202, a first transmission device located in a first network obtaining a multimedia file descriptor and a multimedia file to be transmitted which have a correspondence, wherein the multimedia file descriptor and the multimedia file are stored in different memories;

S204, the first transmission device encoding content of the multimedia file descriptor and content of the multimedia file into a multimedia transmission file in a first format according to a predetermined rule;

S206, the first transmission device sending the multimedia transmission file to a second transmission device located in a second network.

Optionally, in this embodiment, the above multimedia data transmission method may be applied to, but is not limited to, a monitor and transmission system for passing vehicles, thereby achieving the transmission of the data of the passing vehicles monitored by a video network to a private network. Here, the above multimedia file descriptor may include, but is not limited to, monitoring identification data, such as passing vehicle data. The above multimedia file may include, but is not limited to, an identification picture via monitoring, such as a process picture. The above first network and second network may be, but are not limited to, a video network and a private network. The above first transmission device and second transmission device may be, but are not limited to, FTP picture manage servers. The above is only an example to which this embodiment is not limited.

It should be noted that in this embodiment, the process of transmitting a file in the video network 102 to the private network 106 through a border (a third party platform) may also be referred to as ferrying.

Figure 3:
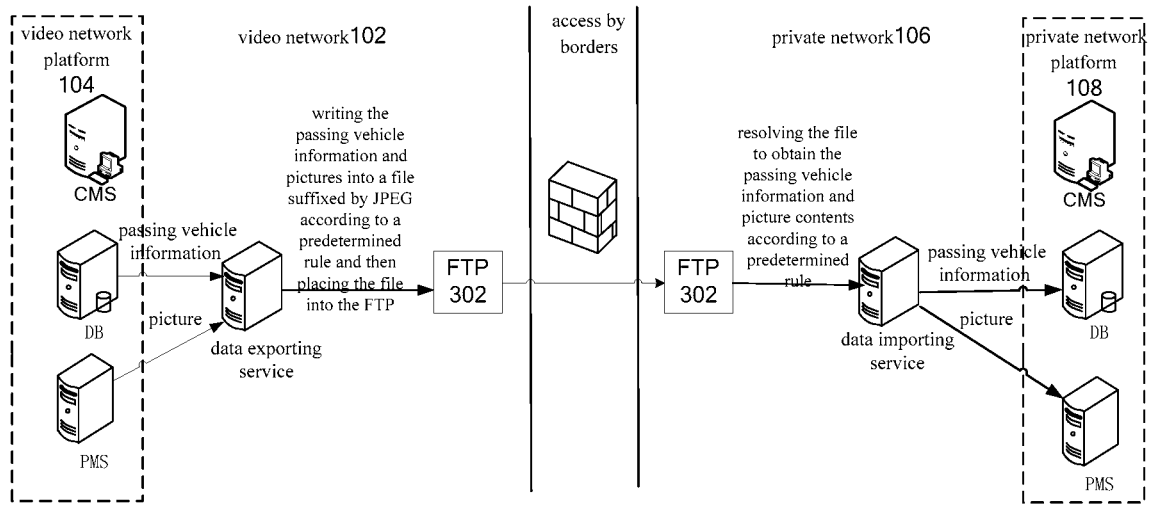
FIG. 3 is a schematic view of the application of a multimedia data transmission method according to an embodiment of the present application.

As shown in FIG. 3, in this embodiment, the above system includes a video network 102 and a corresponding video network platform 104, a private network 106 and a corresponding private network platform 108. In the above system, FTP picture manage servers 302 are provided at the borders close to the video network 102 and the private network 106 respectively. The passing vehicle data monitored by the video network 102 and corresponding passing vehicle pictures downloaded from the PMS are encoded into a multimedia transmission file in a first format according to a predetermined rule by means of a service for exporting passing vehicle data. The multimedia transmission file in the first format is ferried to the FTP picture manage server 302 of the private network 106 by ferrying at the borders of the video network 102 and the private network 106, such that the multimedia transmission file in the first format is read directly within the private network 106 through a data importing service, and the file information therein, i.e. the multimedia file descriptor and the multimedia file (e.g. passing vehicle data and passing vehicle pictures) are obtained by resolving according to a predetermined rule. Thereby the problem that data cannot be transmitted synchronously in the multimedia data transmission methods in related arts is overcome, such that the multimedia file descriptor and the multimedia file monitored by the first transmission device in the first network are transmitted synchronously to the second transmission device in the second network, thereby achieving the objective of transmitting the monitored data synchronously.

In addition, since the predetermined rule is unknown to the third party platform, the transmitted files cannot be resolved correctly by the third party platform (e.g. the border). Therefore, the multimedia file descriptor and the multimedia file obtained synchronously are uploaded to the private network platform 108 at the same time by the second transmission device in the second network, thereby ensuring the security and confidentiality of multimedia data transmission.

It should be noted that in this embodiment, since the multimedia file descriptor and the multimedia file in related arts need to be ferried to the private network from different servers respectively, the problem that multimedia data cannot be transmitted synchronously during ferrying will occur. In order to solve the above problem, the multimedia data transmission method provided in this embodiment can include, but is not limited to, encoding the multimedia file descriptor and the multimedia file which have a correspondence into the multimedia transmission file in the first format according to the predetermined rule, so as to overcome the problem that data cannot be transmitted synchronously due to separate transmission in related arts. In addition, since a third party platform is needed for ferrying, the security and confidentiality of multimedia data transmission is impaired. However, in this embodiment, the multimedia file descriptor and the multimedia file are converted according to the first format as agreed by both sides, wherein the first format is unknown to the third party platform, thereby avoiding the problem of multimedia data leakage resulting from the multimedia data being obtained by the third party platform and then ensuring the security and confidentiality of multimedia data transmission.

Optionally, in this embodiment, the aforesaid first format may be, but is not limited to, a JPEG format. Taking passing vehicle data and passing vehicle pictures as the examples of the multimedia file descriptor and the multimedia file, in the present embodiment, the passing vehicle data and passing vehicle pictures of the video network are written into a file suffixed by JPEG according to certain rules and this file is ferried to the private network for resolving by the private network according to the predetermined rule, thereby obtaining the passing vehicle data and passing vehicle pictures for upload to the private network platform. Thus, the problem that passing vehicle data and passing vehicle pictures cannot be ferried (transmitted) synchronously in prior arts and the problem of information security and confidentiality and the like are overcome.

Optionally, in this embodiment, the correspondence between the multimedia file descriptor and the multimedia file may be, but is not limited to, the multimedia file address indicated by the multimedia file descriptor, which address is used for obtaining the multimedia file. Optionally, in this embodiment, a first transmission device located in a first network obtaining a multimedia file descriptor and a multimedia file to be transmitted which have a correspondence includes: S1, the first transmission device obtaining the multimedia file descriptor from the head of a transmission queue provided in the first transmission device; S2, the first transmission device obtaining the multimedia file from a device in which the multimedia file is stored, which device is indicated by a multimedia file address in the obtained multimedia file descriptor.

Optionally, in this embodiment, the first transmission device sending the multimedia transmission file to the second transmission device located in the second network includes:

1) the first transmission device sending the multimedia transmission file to the second transmission device located in the second network through a third party ferrying device; or 2) the first transmission device sending the multimedia transmission file to the second transmission device through a firewall device;

wherein, the third party ferrying device or the firewall device is used to provide a security border between the first network and the second network.

Optionally, in this embodiment, it is possible to, but is not limited to, insert the multimedia file descriptor, which is not sent successfully, to the end of a transmission queue, wherein the unsuccessfully-sent multimedia file descriptor may include, but is not limited to, at least one of the followings: the first transmission device does not receive a response message sent by the second transmission device within a predetermined time period indicating successful reception of the multimedia transmission file; the first transmission device receives a response message sent by the second transmission device within a predetermined time period indicating failure in receiving the multimedia transmission file. By inserting the unsuccessfully-sent multimedia file descriptor into the end of the transmission queue, the unsuccessfully-transmitted file may be resent while ensuring the multimedia transmission files to be transmitted normally by the first transmission device, thereby ensuring the integrity of data transmission and avoiding leaving out important multimedia data.

With the embodiment of the present application, the first transmission device located in the first network obtains the multimedia file descriptor and the multimedia file to be transmitted which have a correspondence, wherein the multimedia file descriptor and the multimedia file are stored in different memories; the multimedia file descriptor and the multimedia file which have a correspondence are encoded into a multimedia transmission file in a first format according to a predetermined rule, so as to overcome the problem of unsynchronized transmission due to separate transmission in related arts. In addition, the multimedia file descriptor and the multimedia file are converted according to the first format as agreed by both sides, wherein the first format is unknown to the third party platform, thereby avoiding the problem of multimedia data leakage resulting from the multimedia data being obtained by the third party platform and then ensuring the security and confidentiality of multimedia data transmission.

As an optional solution, the first transmission device located in the first network obtaining the multimedia file descriptor and the multimedia file to be transmitted which have a correspondence includes:

S1, the first transmission device obtaining the multimedia file descriptor from the head of the transmission queue provided in the first transmission device;

S2, the first transmission device obtaining the multimedia file from a device in which the multimedia file is stored, which device is indicated by the multimedia file address in the obtained multimedia file descriptor.

Optionally, in this embodiment, the above multimedia file descriptor may, but is not limited to, be stored on the head of the transmission queue according to a time sequence, thereby ensuring that transmission may be executed successively according to the time sequence when transmitting the multimedia data, and then avoiding the problem of leaving out data during the data transmission process. Here, the above multimedia file descriptor may be, but is not limited to, the multimedia file address used to indicate a device in which the multimedia file is stored.

In the embodiment provided by the present application, the multimedia file descriptor is obtained from the head of a transmission queue and the multimedia file is obtained from the multimedia file address in the obtained multimedia file descriptor, such that the multimedia file descriptor and the multimedia file to be transmitted are encoded into a multimedia transmission file in a first format.

As an optional solution, before the first transmission device obtains the multimedia file descriptor from the head of a transmission queue provided in the first transmission device, the method further includes:

S1, the first transmission device importing the multimedia file descriptor obtained in real time into a temporary data table;

S2, the first transmission device obtaining the latest multimedia file descriptor from the temporary data sheet;

S3, the first transmission device inserting the obtained latest multimedia file descriptor into the head of the transmission queue.

It should be noted that in this embodiment, the above temporary data table may, but is not limited to, be used to cache the latest multimedia file descriptor, such that the first transmission device inserts the latest multimedia file descriptor obtained from the temporary data table into the head of the transmission queue, thereby the multimedia file descriptor obtained each time from the head of the transmission queue by the first transmission device is the latest one after updating.

Figure 4:
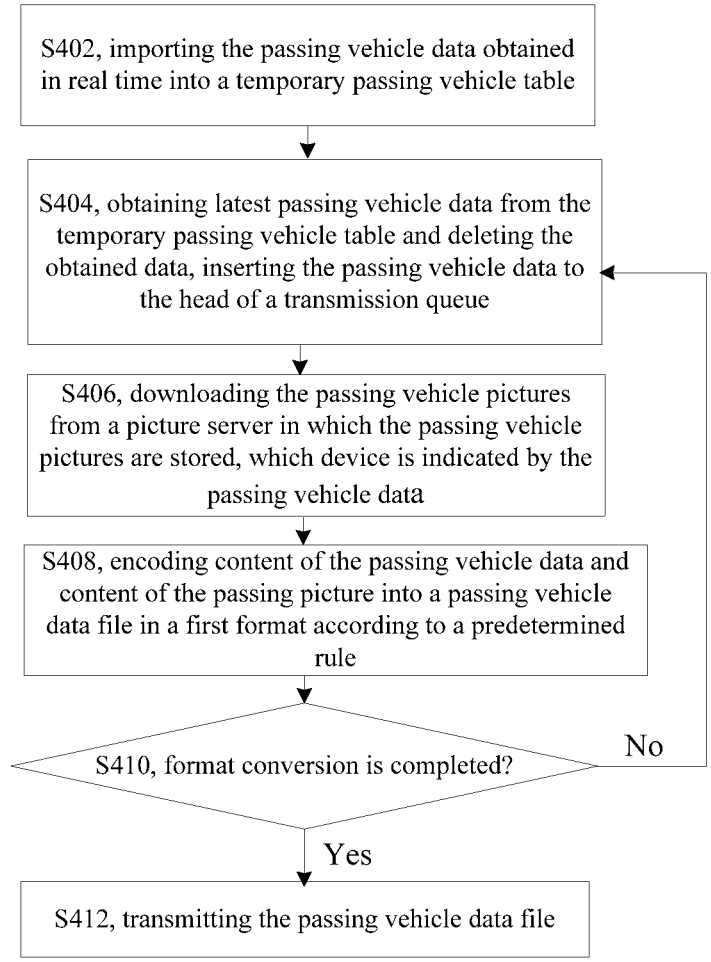
FIG. 4 is a flowchart of another optional multimedia data transmission method according to an embodiment of the present application.

Specifically, illustration is made in connection with the following example. Firstly, a temporary passing vehicle table is established in the database of the video network. As shown in steps S402-S412 in FIG. 4, the passing vehicle data obtained in real time is imported into the temporary passing vehicle table, the latest passing vehicle data is obtained from the temporary passing vehicle table and then the obtained data is deleted through a service for exporting data of the video network, and the passing vehicle data is inserted into the head of a transmission queue. Subsequently, the passing vehicle data is obtained from the head of the transmission queue, the passing vehicle pictures are downloaded from a picture server indicated by the passing vehicle data for storing the passing vehicle pictures, and the content of the passing vehicle data and the content of the passing vehicle pictures are encoded into a passing vehicle data file in a first format according to a predetermined rule. Further, determine whether format conversion of all the data in the temporary passing vehicle table is completed. If the conversion is completed, then step S412 is executed and the above passing vehicle data is transmitted to the private network; if not, the step S404 is executed again.

With the embodiment provided by the present application, the latest multimedia file descriptor after updating is obtained via the temporary data table, thereby ensuring the multimedia data is inserted to the head of the transmission queue in real time.

As an optional solution, the first transmission device sending the multimedia transmission file to the second transmission device located in the second network includes:

S1, the first transmission device sending the multimedia transmission file to the second transmission device located in the second network through a third party ferrying device; or S2, the first transmission device sending the multimedia transmission file to the second transmission device through a firewall device;

wherein, the third party ferrying device or the firewall device is used to provide a security border between the first network and the second network.

For example, the above firewall device may be, but is not limited to, a firewall at the security border as shown in FIG. 3. The above third party ferrying device may, but is not limited to, include the above firewall device and the FTP servers located at the security border between the first network and the second network.

With the embodiment provided by the present application, the multimedia transmission file in the first network is sent to the second transmission device in the second network through a third party ferrying device or a firewall device, thereby avoiding the problem of multimedia data leakage resulting from a third party platform obtaining the multimedia data, thus ensuring the security and confidentiality of multimedia data transmission.

As an optional solution,

S1, after the first transmission device sends the multimedia transmission file to the second transmission device located in the second network, the method further includes: if the first transmission device does not receive a response message sent by the second transmission device within a predetermined time period indicating successful reception of the multimedia transmission file, or if the first transmission device receives a response message sent by the second transmission device within a predetermined time period indicating failure in receiving the multimedia transmission file, then the first transmission device inserting the multimedia file descriptor to the end of the transmission queue; or S2, before the first transmission device sends the multimedia transmission file to the second transmission device located in the second network, the method further includes: if the first transmission device fails to obtain the multimedia file, then the first transmission device inserting the multimedia file descriptor to the end of the transmission queue.

It should be noted that in this embodiment, after the first transmission device sends the multimedia transmission file to the second transmission device located in the second network, the situation in which the sending fails may occur, but it is not limited thereto. In this situation, it is possible to, but is not limited to, insert the unsuccessfully-sent multimedia file descriptor to the end of the transmission queue. Here, the multimedia file descriptor may include, but is not limited to, at least one of the followings: the first transmission device does not receive a response message sent by the second transmission device within a predetermined time period indicating successful reception of the multimedia transmission file; the first transmission device receives a response message sent by the second transmission device within a predetermined time period indicating failure in receiving the multimedia transmission file.

With the embodiment provided by the present application, the unsuccessfully-obtained multimedia file is inserted to the end of the transmission queue, thereby the unsuccessfully-transmitted file is re-transmitted, thus ensuring the integrity of data transmission and avoiding leaving out important multimedia data.

With the description of the above embodiment, a person skilled in the art may clearly understand that the method according to the above embodiment may be implemented by means of software along with necessary general hardware platforms. Of course, the method may also be implemented by hardware, but in many cases the former is a better implementation. Based on such understanding, essential parts of the technical solution of the present application or parts that contribute to the prior art of the technical solutions of the present application may be embodied by means of a software product which is stored in a storage medium (e.g. ROM/RAM, magnetic disk, optical disk or the like) and contains instructions to perform the methods in various embodiments of the present application when executed by a terminal device (which may be a mobile phone, a computer, a server or a network device or the like).

Embodiment 2

According to the embodiments of the present application, an embodiment of a multimedia data transmission method is provided. It should be noted that the steps shown in the flowchart in the drawings may be executed for example in a computer system with a set of computer executable instructions. Although a logic sequence is shown in the flowchart, the steps shown or described may be executed in a different sequence in certain situations.

Figure 5:
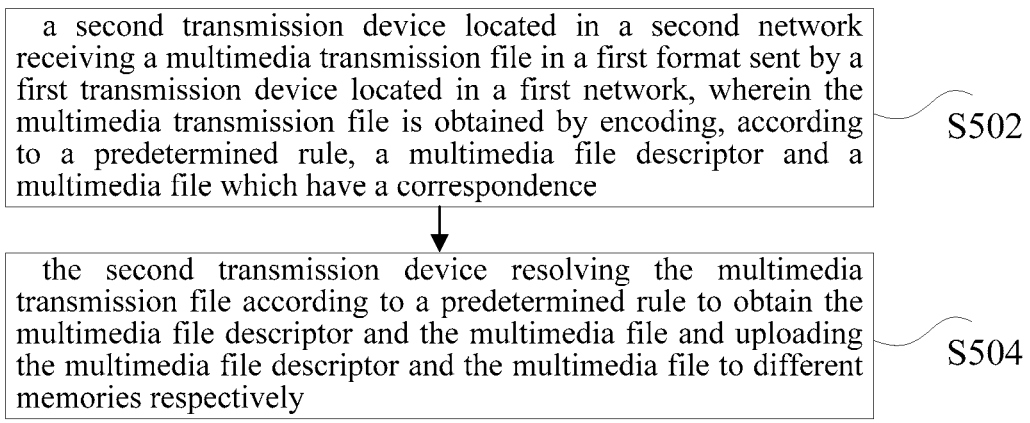
FIG. 5 is a flowchart of yet another optional multimedia data transmission method according to an embodiment of the present application.

According to an embodiment of the present application, a multimedia data transmission method is provided. As shown in FIG. 5, the method includes:

S502, a second transmission device located in a second network receiving a multimedia transmission file in a first format sent by a first transmission device located in a first network, wherein the multimedia transmission file is obtained by encoding, according to a predetermined rule, a multimedia file descriptor and a multimedia file which have a correspondence;

S504, the second transmission device resolving the multimedia transmission file according to a predetermined rule to obtain the multimedia file descriptor and the multimedia file and uploading the multimedia file descriptor and the multimedia file to different memories respectively.

Optionally, in this embodiment, the above multimedia data transmission method may be applied to, but is not limited to, a monitor and transmission system for passing vehicles, thereby achieving the transmission of the data of the passing vehicles monitored by a video network to a private network. Here, the above multimedia file descriptor may include, but is not limited to, monitoring identification data, such as passing vehicle data. The above multimedia file may include, but is not limited to, an identification picture via monitoring, such as a process picture. The above first network and second network may be, but are not limited to, a video network and a private network. The above first transmission device and the second transmission device may be, but are not limited to, FTP picture manage servers. The above is only an example to which this embodiment is not limited.

It should be noted that in this embodiment, the process of transmitting a file in the video network 102 to the private network 106 through a border (a third party platform) may also be referred to as ferrying.

As shown in FIG. 3, in this embodiment, the above system includes a video network 102 and a corresponding video network platform 104, a private network 106 and a corresponding private network platform 108. In the above system, FTP picture manage servers 302 are provided at the borders close to the video network 102 and the private network 106 respectively. The passing vehicle data monitored by the video network 102 and corresponding passing vehicle pictures downloaded from the PMS are encoded into a multimedia transmission file in a first format according to a predetermined rule by means of a service for exporting passing vehicle data. The multimedia transmission file in the first format is ferried to the FTP picture manage server 302 of the private network 106 by ferrying at the borders of the video network 102 and the private network 106, such that the multimedia transmission file in the first format is read directly within the private network 106 through a data importing service, and the file information therein, i.e. the multimedia file descriptor and the multimedia file (e.g. passing vehicle data and passing vehicle pictures) are obtained by resolving according to a predetermined rule. Thereby the problem that data cannot be transmitted synchronously in the multimedia data transmission methods in related arts is overcome, such that the multimedia file descriptor and the multimedia file monitored by the first transmission device in the first network are transmitted synchronously to the second transmission device in the second network, thereby achieving the objective of transmitting the monitored data synchronously.

In addition, since the predetermined rule is unknown to the third party platform (such as the border), the transmitted files cannot be resolved correctly by the third party platform. Therefore, the multimedia file descriptor and the multimedia file obtained synchronously are uploaded to the private network platform 108 at the same time by the second transmission device in the second network, thereby ensuring the security and confidentiality of multimedia data transmission.

It should be noted that in this embodiment, since the multimedia file descriptor and the multimedia file in related arts need to be ferried to the private network from different servers respectively, the problem that multimedia data cannot be transmitted synchronously during ferrying will occur. In order to solve the above problem, the multimedia data transmission method provided in this embodiment can include, but is not limited to, encoding the multimedia file descriptor and the multimedia file which have a correspondence into the multimedia transmission file in the first format according to the predetermined rule, so as to overcome the problem that data cannot be transmitted synchronously due to separate transmission in related arts. In addition, since a third party platform is needed for ferrying, the security and confidentiality of multimedia data transmission is impaired. However, in this embodiment, the multimedia file descriptor and the multimedia file are converted according to the first format as agreed by both sides, wherein the first format is unknown to the third party platform, thereby avoiding the problem of multimedia data leakage resulting from the multimedia data being obtained by the third party platform and then ensuring the security and confidentiality of multimedia data transmission.

Optionally, in this embodiment, the first format may be, but is not limited to, a JPEG format. Taking passing vehicle data and passing vehicle pictures as the examples of the multimedia file descriptor and the multimedia file, in the present embodiment, the passing vehicle data and passing vehicle pictures of the video network are written into a file suffixed by JPEG according to certain rules and this file is ferried to the private network for resolving by the private network according to the predetermined rule, thereby obtaining the passing vehicle data and passing vehicle pictures for upload to the private network platform. Thus, the problem that passing vehicle data and picture cannot be ferried (transmitted) synchronously in prior arts and the problem of related information security and confidentiality and the like are overcome.

Optionally, in this embodiment, the second transmission device located in the second network receiving the multimedia transmission file in the first format sent by the first transmission device located in the first network includes: S1, the second transmission device storing the multimedia transmission file into a local shared folder after receiving the multimedia transmission file sent by the first transmission device.

It should be noted that in this embodiment, by storing the multimedia transmission file into the shared folder, the second transmission device in the second network can obtain the multimedia transmission file directly from the shared folder rapidly, thereby achieving the effects of improving the efficiency for obtaining the multimedia transmission file and reducing obtaining time.

Optionally, in this embodiment, the second transmission device located in the second network receiving the multimedia transmission file in the first format sent by the first transmission device in the first network further includes: S1, after it is found out that a new multimedia transmission file is stored in the shared folder, the second transmission device obtaining the newly stored multimedia transmission file from the shared folder and storing it into an intermediate folder located locally.

It should be noted that in this embodiment, the new multimedia transmission file obtained in the shared folder is stored in the intermediate folder located locally, which ensures the stability of obtaining the multimedia transmission file each time and avoiding influence on the multimedia transmission file due to real-time variations of the shared folder, thus ensuring the accuracy of the obtained multimedia transmission file. In addition, it is also possible to prevent rescanning in the shared folder to avoid the upload of blocking data, thereby achieving the effects of improving the maintainability and expandability of a interfacing program.

Optionally, in this embodiment, the second transmission device resolving the multimedia transmission file according to a predetermined rule to obtain the multimedia file descriptor and the multimedia file and uploading the multimedia file descriptor and the multimedia file to different memories respectively includes:

S1, the second transmission device obtaining the multimedia transmission file from the shared folder or the intermediate folder and resolving the multimedia transmission file according to a predetermined rule to obtain the multimedia file descriptor and the multimedia file; the second transmission device storing the multimedia file descriptor to an uploading queue and a first database located locally; the second transmission device obtaining the multimedia file descriptor from the uploading queue and obtaining the corresponding multimedia file according to this multimedia file descriptor; the second transmission device uploading the multimedia file descriptor and the multimedia file to different memories respectively; or S2, the second transmission device obtaining the multimedia transmission file from the shared folder or the intermediate folder; the second transmission device storing the multimedia transmission file to an uploading queue located locally; the second transmission device obtaining the multimedia transmission file from the uploading queue and resolving the multimedia transmission file according to the predetermined rule to obtain the multimedia file descriptor and the multimedia file; the second transmission device storing the multimedia file descriptor to a first data base located locally; the second transmission device uploading the multimedia file descriptor and the multimedia file to different memories respectively.

Optionally, when the second transmission device resolves the multimedia transmission file according to the predetermined rule to obtain the multimedia file descriptor and the multimedia file and stores the multimedia file descriptor to an uploading queue and a first database located locally, the obtained multimedia file may be stored into the shared folder or the intermediate folder, and after obtaining the multimedia file descriptor from the uploading queue, the second transmission device then obtains corresponding multimedia file from the shared folder or the intermediate folder.

Optionally, in this embodiment, if the second transmission device uploads the multimedia file descriptor and the multimedia file successfully, then the state identifier of the multimedia file descriptor in the first database is set as a success state; if the second transmission device fails to upload the multimedia file descriptor or the multimedia file, then the state identifier of the multimedia file descriptor in the first database is set as a failure state.

It should be noted that in this embodiment, for the multimedia file descriptor in the first database with a failure state identifier, the following steps may be executed, without being limited thereto:

S1, inquiring whether there is a multimedia file descriptor with a failure state identifier in the first database;

S2, if so, then the second transmission device obtaining the multimedia file descriptor with a failure state identifier, and/or obtaining the multimedia file corresponding to the multimedia file descriptor and re-uploading the multimedia file descriptor and/or the multimedia file which have been uploaded unsuccessfully.

Optionally, in this embodiment, after obtaining the multimedia file descriptor with a failure state identifier, the second transmission device will, according to the multimedia file descriptor, obtain the corresponding multimedia file from the shared folder or the intermediate folder for re-upload, or, obtain the corresponding multimedia transmission file from the shared folder or the intermediate folder and obtain the corresponding multimedia file by resolving the multimedia transmission file for re-upload.

Moreover, in this embodiment, for the multimedia file descriptor in the first database with a success state identifier, the following steps may be executed, without being limited thereto:

S1, inquiring whether there is a multimedia file descriptor with a success state identifier in the first database;

S2, if so, the second transmission device deleting the multimedia file descriptor with a success state identifier in the first database.

Optionally, in this embodiment, while deleting the multimedia file descriptor with a success state identifier in the first database, the second transmission device also deletes the corresponding multimedia transmission file in the shared folder or the intermediate folder and/or the corresponding multimedia file.

With the embodiment provided by the present application, a second transmission device located in a second network receives a multimedia transmission in a first format sent by a first transmission device located in a first network, wherein the multimedia transmission file is obtained by encoding content of multimedia file descriptor and the content of a multimedia file which have a correspondence according to a predetermined rule; the second transmission device resolves the multimedia transmission file according to a predetermined rule to obtain the multimedia file descriptor and the multimedia file and uploads the multimedia file descriptor and the multimedia file to different memories respectively. That is, the multimedia file descriptor and the multimedia file in the first network, which would otherwise be ferried from different servers to the second network respectively, are encoded into a multimedia transmission file in a first format according to the first format for transmission, such that it can be resolved by the second transmission device located in the second network according to the first format to obtain the multimedia file descriptor and the multimedia file, thereby overcoming the problem that multimedia data cannot be transmitted synchronously during ferrying in related arts, and thus achieving synchronous resolving of the multimedia transmission file in the first format transmitted synchronously. In addition, the multimedia file descriptor and the multimedia file are converted according to the first format as agreed by both sides, wherein the first format is unknown to the third party platform, thereby avoiding the problem of multimedia data leakage resulting from the multimedia data being obtained by the third party platform and then ensuring the security and confidentiality of multimedia data transmission.

As an optional solution, the second transmission device located in the second network receiving the multimedia transmission file in the first format sent by the first transmission device located in the first network includes:

S1, after receiving the multimedia transmission file sent by the first transmission device, the second transmission device storing the multimedia transmission file to a local shared folder.

Optionally, in this embodiment, the above local shared folder is used to share files with second transmission devices in the second network such that each of the second transmission devices in the second network may access and obtain the multimedia transmission file.

Optionally, in this embodiment, it is possible to look up the multimedia transmission file in the local shared folder and the multimedia transmission file found is resolved according to the predetermined rule to obtain the passing vehicle data and the passing vehicle pictures. In this way, each second transmission device in the second network obtains the multimedia transmission file directly from the shared folder rapidly, thereby achieving the effects of improving the efficiency for obtaining the multimedia transmission file and reducing obtaining time.

With the embodiment provided by the present application, the multimedia transmission file is obtained from the local shared folder, so as to obtain the multimedia transmission file directly and rapidly, thus achieving the effects of improving the efficiency of obtaining the multimedia transmission file and reducing the obtaining time.

As an optional solution, the second transmission device located in the second network receiving the multimedia transmission file in the first format sent by the first transmission device located in the first network further includes:

S1, after it is found out that a new multimedia transmission file is stored in the shared folder, the second transmission device obtaining the newly stored multimedia transmission file from the shared folder and storing it into an intermediate folder located locally.

Figure 6:
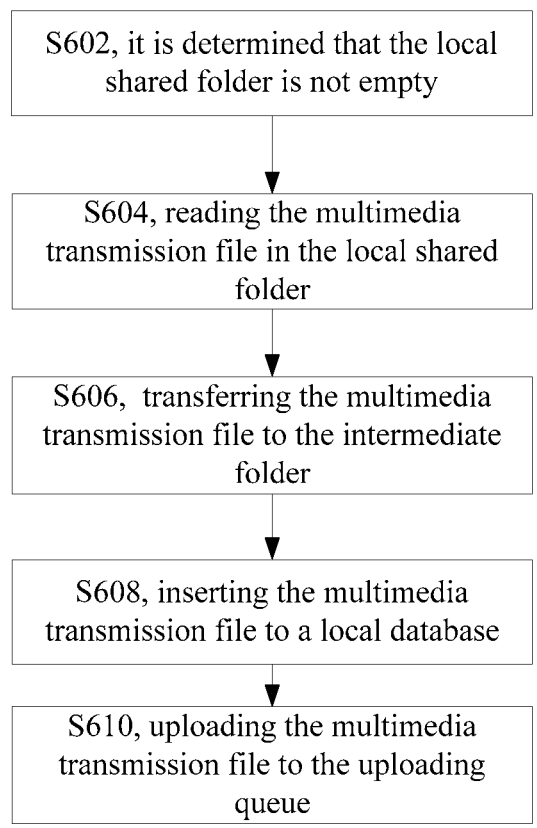
FIG. 6 is a flowchart of yet another optional multimedia data transmission method according to an embodiment of the present application.

Illustration is made in connection with the following example. As in steps S602-S610 shown in FIG. 6, if it is determined that the local shared folder is not empty, then step S604 of reading the multimedia transmission file in the local shared folder is performed, and then step S606 of transferring the read multimedia transmission file from the shared folder to the intermediate folder is performed. Further, steps S608-S610 are performed, which are inserting the multimedia transmission file to a local database and uploading it to the uploading queue.

In the embodiment provided by the present application, the new multimedia file obtained in the shared folder is stored in the intermediate folder located locally, which ensures the stability of obtaining the multimedia transmission file each time and avoiding influence on the multimedia transmission file due to real-time variations of the shared folder, thus ensuring the accuracy of the obtained multimedia transmission file. In addition, it is also possible to prevent rescanning in the shared folder to avoid the problem of blocking data upload, thereby achieving the effect of improving maintainability and expandability of a docking program.

As an optional solution, the second transmission device resolving the multimedia transmission file according to the predetermined rule to obtain the multimedia file descriptor and the multimedia file and uploading the multimedia file descriptor and the multimedia file to different memories respectively includes:

S1, the second transmission device obtaining the multimedia transmission file from the shared folder or the intermediate folder and resolving the multimedia transmission file according to the predetermined rule to obtain the multimedia file descriptor and the multimedia file; the second transmission device storing the multimedia file descriptor into an uploading queue and a first database located locally; the second transmission device obtaining the multimedia file descriptor from the uploading queue and obtaining the corresponding multimedia file according to this multimedia file descriptor; the second transmission device uploading the multimedia file descriptor and the multimedia file to different memories respectively; or S2, the second transmission device obtaining the multimedia transmission file from the shared folder or the intermediate folder; the second transmission device storing the multimedia transmission file into an uploading queue located locally; the second transmission device obtaining the multimedia transmission file from the uploading queue and resolving the multimedia transmission file according to a predetermined rule to obtain the multimedia file descriptor and the multimedia file; the second transmission device storing the multimedia file descriptor into a first data base located locally; the second transmission device uploading the multimedia file descriptor and the multimedia file to different memories respectively.

Optionally, in this embodiment, the second transmission device may, after obtaining the multimedia transmission file from the shared folder or the intermediate folder, obtain the multimedia file descriptor and the multimedia file by resolving the multimedia transmission file and then stores the same into the uploading queue and the first database located locally. The second transmission device may also stores the multimedia transmission file directly into the uploading queue located locally, and then stores the multimedia file descriptor into the first database located locally after obtaining the multimedia file descriptor and the multimedia file by resolving the multimedia transmission file. This embodiment is not limited to the above.

Figure 7:
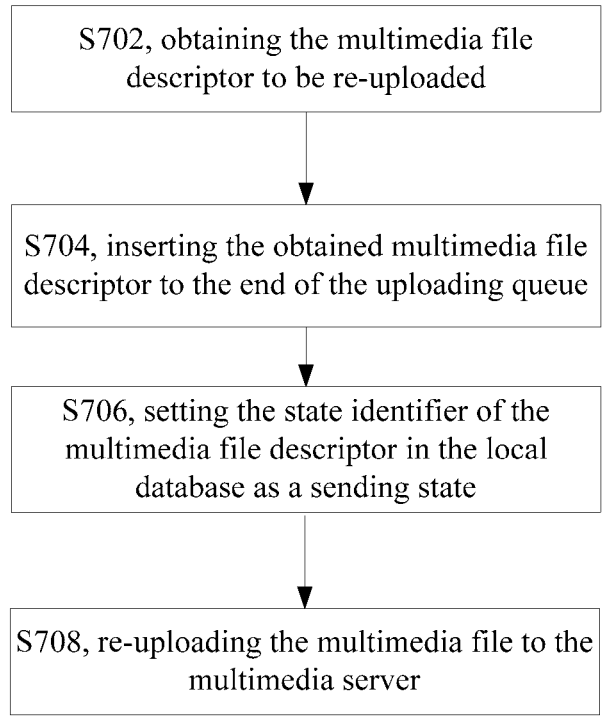
FIG. 7 is a flowchart of yet another optional multimedia data transmission method according to an embodiment of the present application.

Illustration is made in connection with the following example. As in steps S702-S708 shown in FIG. 7, the multimedia file descriptor to be re-uploaded is obtained from the local database, the obtained multimedia file descriptor is inserted to the end of the uploading queue (in order to ensure that new data is processed firstly, the insertion is done only when the amount of data in the sending queue is less than half of the upper limit of the queue), the state identifier of the multimedia file descriptor in the local database is set to be a sending state, and the multimedia file is re-uploaded to a multimedia server when the position of the multimedia file descriptor is changed from the end to the head of the uploading queue. The re-uploading strategy ensures the time delay of each re-upload is increased nonlinearly, for example, the first six re-uploads occur within one hour and the last re-upload occurs on the fifth day.

With the embodiment provided by the present application, the multimedia file descriptor to be re-uploaded is inserted to the uploading queue, the multimedia file descriptor and the multimedia file are stored into different memories respectively, thereby the unsuccessfully-sent multimedia file can be re-uploaded, thus ensuring the integrity of data transmission and avoiding leaving out important multimedia data.

As an optional solution, the above method further includes:

S1, if the second transmission device uploads the multimedia file descriptor and the multimedia file successfully, then setting the state identifier of the multimedia file descriptor in the first database as a success state; if the second transmission device fails to upload the multimedia file descriptor or the multimedia file, then setting the state identifier of the multimedia file descriptor in the first database as a failure state.

As an optional implementation, for the multimedia file descriptor in the first database with a failure state identifier, the following steps may be executed, without being limited thereto:

S1, inquiring whether there is a multimedia file descriptor with a failure state identifier in the first database;

S2, if so, then the second transmission device obtaining the multimedia file descriptor with a failure state identifier, and/or obtaining the multimedia file corresponding to the multimedia file descriptor and re-uploading the multimedia file descriptor and/or the multimedia file which have been uploaded unsuccessfully.

Optionally, in this embodiment, time interval between two adjacent re-uploads may be in, but is not limited to, the form of nonlinear growth.

As an optional implementation, for the multimedia file descriptor in the first database with a success state identifier, the following steps may be executed, without being limited thereto:

S1, inquiring whether there is a multimedia file descriptor with a success state identifier in the first database;

S2, if so, the second transmission device deleting the multimedia file descriptor with a success state identifier in the first database.

Optionally, in this embodiment, the ways of deleting the multimedia file descriptor may be, but is not limited to, at least one of the followings: deleting the multimedia file descriptors within a predetermined time period, deleting the multimedia file descriptors when the remaining disk capacity of the second transmission device is smaller than a predetermined threshold. Here, after one deletion is completed, it is also possible to reset a deleting state when a predetermined condition (e.g. reaching a predetermined moment or the remaining disk capacity is greater than a predetermined threshold) is satisfied, but the embodiment is not limited thereto.

For example, if the first threshold is 20% and the second threshold is 60%, then when the remaining disk capacity is smaller than 20%, deletion is executed until the remaining disk capacity is greater than 60%.

For another example, it is found by inquiry that the number of deletable multimedia file descriptors in the database at the current moment is m; then in this example, the earliest m multimedia file descriptors can be deleted along with the corresponding picture files.

It should be noted that in this embodiment, for the multimedia file descriptor in the first database with a failure state identifier, it is possible to, but not limited to, re-upload at least one type of the following information: the multimedia file descriptor or multimedia file which have been uploaded unsuccessfully. That is, either the multimedia file descriptor or the multimedia file may fail to be uploaded and therefore. When a failure state is determined, re-upload is performed to ensure the integrity of data transmission and avoid leaving out important multimedia data. In addition, for a multimedia file descriptor in the first database with a success state identifier, it is possible to delete the corresponding multimedia file descriptor, but the embodiment is not limited thereto.

With the embodiment provided by the present application, for multimedia file descriptors in the first database with a success state identifier and a failure state identifier, different steps are executed respectively. In the case of successful upload of the multimedia file descriptor and multimedia file, corresponding contents are deleted timely, so as to avoid occupying too much storage space. In the case of unsuccessful upload of the multimedia file descriptor or the multimedia file, re-upload is performed timely, so as to avoid leaving out data.

As an optional solution, the second transmission device obtaining the multimedia file descriptor with a failure state identifier, and/or obtaining the multimedia file corresponding to the multimedia file descriptor and re-uploading the multimedia file descriptor and/or the multimedia file which have been uploaded unsuccessfully includes:

S1, the second transmission device obtaining the multimedia file descriptor from the first database; and/or the second transmission device obtaining multimedia file corresponding to the multimedia file descriptor from the shared folder or the intermediate folder;

S2, the second transmission device inserting the obtained multimedia file descriptor and/or multimedia file to the end of the uploading queue;

S3, the second transmission device re-uploading the multimedia file descriptor and/or multimedia file to corresponding memories when the position of the multimedia file descriptor and/or multimedia file changes from the end to the head of the uploading queue.

With the embodiment provided by the present application, for a multimedia file descriptor with a failure state identifier, the multimedia file descriptor is obtained from the first database again, and/or the multimedia file corresponding to the multimedia file descriptor is obtained from the shared folder or the intermediate folder, the multimedia file descriptor and/or the multimedia file is inserted to the end of the uploading queue, so as to re-upload the multimedia file descriptor and/or the multimedia file to corresponding memories when the position of the multimedia file descriptor and/or the multimedia file is changed from the end to the head of the uploading queue, thereby achieving timely re-upload of the content which have been uploaded unsuccessfully.

As an optional solution, the second transmission device deleting the multimedia file descriptor with a success state identifier in the first database includes:

S1, when the remaining storage capacity of the second transmission device is smaller than a first threshold and the current time is within a predetermined time period, the second transmission device deleting the multimedia file descriptor with a success state identifier in the first database until the current time is beyond the predetermined time period or, until the remaining storage capacity is larger than a second threshold, wherein the second threshold is greater than the first threshold.

In the embodiment provided by the present application, for a multimedia file descriptor with a success state identifier, the multimedia file descriptor is deleted according to a predetermined condition, thereby ensuring enough storage space.

Embodiment 3

According to the embodiments of the present application, an embodiment of a multimedia data transmission method is further provided. It should be noted that the steps shown in the flowchart in the drawings may be executed for example in a computer system with a set of computer executable instructions. Although a logic sequence is shown in the flowchart the steps shown or described may be executed in a different sequence.

S1, a first transmission device located in a first network obtaining a multimedia file descriptor and a multimedia file to be transmitted which have a correspondence, wherein the multimedia file descriptor and the multimedia file are stored in different memories;

S2, the first transmission device encoding content of the multimedia file descriptor and content of the multimedia file into a multimedia transmission file in a first format according to a predetermined rule;

S3, the first transmission device sending the multimedia transmission file to a second transmission device located in a second network.

S4, the second transmission device located in the second network receiving the multimedia transmission file in the first format sent by the first transmission device located in the first network, wherein the multimedia transmission file is obtained by encoding, according to a predetermined rule, the multimedia file descriptor and the multimedia file which have a correspondence;

S5, the second transmission device resolving the multimedia transmission file to obtain the multimedia file descriptor and the multimedia file according to the predetermined rule and uploading the multimedia file descriptor and the multimedia file to different memories respectively.

Optionally, in this embodiment, the above multimedia data transmission method may be applied to, but is not limited to, a monitor and transmission system for passing vehicles, thereby achieving the transmission of the data of the passing vehicles monitored by a video network to a private network. Here, the above multimedia file descriptor may include, but is not limited to, monitoring identification data, such as passing vehicle data. The above multimedia file may include, but is not limited to, an identification picture via monitoring, such as a process picture. The above first network and second network may be, but are not limited to, a video network and a private network. The above first transmission device and the second transmission device may be, but are not limited to, FTP picture manage servers. The above method is only an example to which this embodiment is not limited.

It should be noted that in this embodiment, the process of transmitting a file in the video network 102 to the private network 106 through a border (a third party platform) may also be referred to as ferrying.

As shown in FIG. 3, in this embodiment, the above system includes a video network 102 and a corresponding video network platform 104, a private network 106 and a corresponding private network platform 108. In the above system, FTP picture manage servers 302 are provided at the borders close to the video network 102 and the private network 106 respectively. The passing vehicle data monitored by the video network 102 and corresponding passing vehicle pictures downloaded from the PMS are encoded into a multimedia transmission file in a first format according to a predetermined rule by means of a service for exporting passing vehicle data. The multimedia transmission file in the first format is ferried to the FTP picture manage server 302 of the private network 106 by ferrying at the borders of the video network 102 and the private network 106, such that, the multimedia transmission file in the first format is read directly within the private network 106 through a data importing service, and the file information therein, i.e. the multimedia file descriptors and the multimedia files (e.g. passing vehicle data and passing vehicle pictures), are obtained by resolving according to a predetermined rule. Thereby the problem that data cannot be transmitted synchronously in the multimedia data transmission methods in related arts is overcome, such that the multimedia file descriptor and the multimedia file monitored by the first transmission device in the first network are transmitted to the second transmission device in the second network, thereby achieving the objective of transmitting the monitored data synchronously.

In addition, since the predetermined rule is unknown to the third party platform (such as the border), the transmitted files cannot be resolved correctly by the third party platform. Therefore, the multimedia file descriptor and the multimedia file obtained synchronously are uploaded to the private network platform 108 at the same time by the second transmission device in the second network, thereby ensuring the security and confidentiality of multimedia data transmission.

It should be noted that in this embodiment, since the multimedia file descriptor and the multimedia file in related arts need to be ferried to the private network from different servers respectively, the problem that multimedia data cannot be transmitted synchronously during ferrying will occur. In order to solve the above problem, the multimedia data transmission method provided in this embodiment can include, but is not limited to, encoding the multimedia file descriptor and the multimedia file which have a correspondence into the multimedia transmission file in the first format according to the predetermined rule, so as to overcome the problem that data cannot be transmitted synchronously due to separate transmission in related arts. In addition, since a third party platform is required for ferrying, the security and confidentiality of multimedia data transmission is impaired. However, in this embodiment, the multimedia file descriptor and the multimedia file are converted according to the first format as agreed by both sides, wherein the first format is unknown to the third party platform, thereby avoiding the problem of multimedia data leakage resulting from the multimedia data being obtained by the third party platform and then ensuring the security and confidentiality of multimedia data transmission.

Optionally, the specific examples in this embodiment may make reference to the examples described in the above embodiment 1 and embodiment 2, which is not repeated here in this embodiment.

Embodiment 4

In this embodiment, a multimedia data transmission device is further provided, which is used to implement the above embodiments and preferable implementations, and the contents that have been illustrated are not repeated. As used below, the term "module" may be combinations of software and/or hardware that can achieve predetermined functions. Although the devices described in the embodiments below are preferably implemented by means of software, it is conceivable that it is implemented by means of hardware or a combination of software and hardware.

Figure 8:
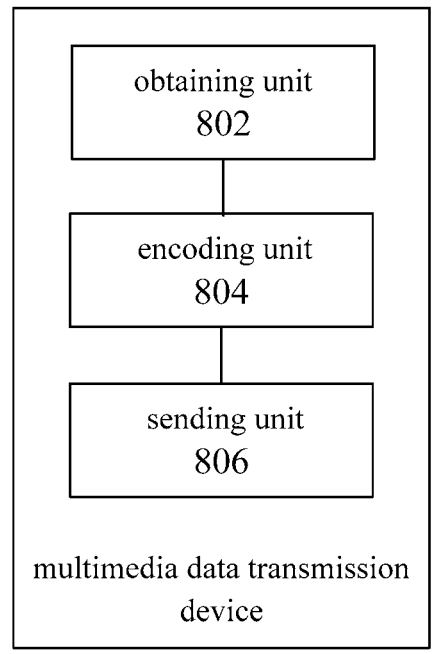
FIG. 8 is a schematic view of an optional multimedia data transmission device according to an embodiment of the present application.

According to an embodiment of the present application, a multimedia data transmission device for implementing the above multimedia data transmission method is further provided, which is a first transmission device located in a first network. As shown in FIG. 8, the device includes:

1) an obtaining unit 802 used for obtaining a multimedia file descriptor and a multimedia file to be transmitted which have a correspondence, wherein the multimedia file descriptor and the multimedia file are stored in different memories;

2) an encoding unit 804 used for encoding content of the multimedia file descriptor and content of the multimedia file into a multimedia transmission file in a first format according to a predetermined rule;

3) a sending unit 806 used for sending the multimedia transmission file to a second transmission device located in a second network.

Optionally, in this embodiment, the above multimedia data transmission device may be applied to, but is not limited to, a monitor and transmission system for passing vehicles, thereby achieving the transmission of the data of the passing vehicles monitored by a video network to a private network. Here, the above multimedia file descriptor may be, but is not limited to, monitoring identification data, such as passing vehicle data. The above multimedia file may be, but is not limited to, an identification picture via monitoring, such as a process picture. The above first network and second network may be, but are not limited to, a video network and a private network. The above first transmission device and the second transmission device may be, but are not limited to, FTP picture manage servers. The above is only an example, to which this embodiment is not limited.

It should be noted that in this embodiment, the process of transmitting a file in the video network 102 to the private network 106 through a border (a third party platform) may also be referred to as ferrying.

As shown in FIG. 3, in this embodiment, the above system includes a video network 102 and a corresponding video network platform 104, a private network 106 and a corresponding private network platform 108. In the above system, FTP picture manage servers 302 are provided at the borders close to the video network 102 and the private network 106 respectively. The passing vehicle data monitored by the video network 102 and corresponding passing vehicle pictures downloaded from the PMS are encoded into a multimedia transmission file in a first format according to a predetermined rule by means of a service for exporting passing vehicle data. The multimedia transmission file in the first format is ferried to the FTP picture manage server 302 of the private network 106 by ferrying at the borders of the video network 102 and the private network 106, such that the multimedia transmission file in the first format is read directly within the private network 106 through a data importing service, and the file information therein, i.e. the multimedia file descriptor and the multimedia file (e.g. passing vehicle data and passing vehicle pictures), are obtained by resolving according to a predetermined rule. Thereby the problem that data cannot be transmitted synchronously in the multimedia data transmission methods in related arts is overcome, such that the multimedia file descriptor and the multimedia file monitored by the first transmission device in the first network are transmitted synchronously to the second transmission device in the second network is achieved, thereby achieving the objective of transmitting the monitored data synchronously.

In addition, since the predetermined rule is unknown to the third party platform (e.g. the border), the transmitted files cannot be resolved correctly by the third party platform. Therefore, the multimedia file descriptor and the multimedia file obtained synchronously are uploaded to the private network platform 108 at the same time by the second transmission device in the second network, thereby ensuring the security and confidentiality of multimedia data transmission.

It should be noted that in this embodiment, since the multimedia file descriptor and the multimedia file in related arts need to be ferried to the private network from different servers respectively, the problem that multimedia data cannot be transmitted synchronously during ferrying will occur. In order to solve the above problem, the multimedia data transmission method provided in this embodiment can include, but is not limited to, encoding the multimedia file descriptor and the multimedia file which have a correspondence into the multimedia transmission file in the first format according to the predetermined rule, so as to overcome the problem that data cannot be transmitted synchronously due to separate transmission in related arts. In addition, since a third party platform is needed for ferrying, the security and confidentiality of multimedia data transmission is impaired. However, in this embodiment, the multimedia file descriptor and the multimedia file are converted according to the first format as agreed by both sides, wherein the first format is unknown to the third party platform, thereby avoiding the problem of multimedia data leakage resulting from the multimedia data being obtained by the third party platform and then ensuring the security and confidentiality of multimedia data transmission.

Optionally, in this embodiment, the aforesaid first format may be, but is not limited to, a JPEG format. Taking passing vehicle data and passing vehicle pictures as the examples of the multimedia file descriptor and the multimedia file, in the present embodiment, the passing vehicle data and passing vehicle pictures of the video network are written into a file suffixed by JPEG according to certain rules and this file is ferried to the private network for resolving by the private network according to the predetermined rule, thereby obtaining the passing vehicle data and passing vehicle pictures for upload to the private network platform. Thus, the problem that passing vehicle data and passing vehicle pictures cannot be ferried (transmitted) synchronously in prior arts, and the problem of information security and confidentiality and the like are overcome.

Optionally, in this embodiment, the correspondence between the multimedia file descriptor and the multimedia file may be, but is not limited to, the multimedia file address indicated by the multimedia file descriptor, which address is used for obtaining the multimedia file. Optionally, in this embodiment, a first transmission device located in a first network obtaining a multimedia file descriptor and a multimedia file to be transmitted which have a correspondence includes: S1, the first transmission device obtaining the multimedia file descriptor from the head of a transmission queue provided in the first transmission device; S2, the first transmission device obtaining the multimedia file from a device in which the multimedia file is stored, which device is indicated by a multimedia file address in the obtained multimedia file descriptor.

Optionally, in this embodiment, the first transmission device sending the multimedia transmission file to the second transmission device located in the second network includes:

1) the first transmission device sending the multimedia transmission file to the second transmission device located in the second network through a third party ferrying device; or 2) the first transmission device sending the multimedia transmission file to the second transmission device through a firewall device;

wherein, the third party ferrying device or the firewall device is used to provide a security border between the first network and the second network.

Optionally, in this embodiment, it is possible to, but is not limited to, insert the multimedia file descriptor, which is not sent successfully, to the end of a transmission queue, wherein the unsuccessfully-sent multimedia file descriptor may include, but is not limited to, at least one of the followings: the first transmission device does not receive a response message sent by the second transmission device within a predetermined time period indicating successful reception of the multimedia transmission file; the first transmission device receives a response message sent by the second transmission device within a predetermined time period indicating failure in receiving the multimedia transmission file. By inserting the unsuccessfully-sent multimedia file descriptor into the end of the transmission queue, the unsuccessfully-transmitted file may be resent while ensuring the multimedia transmission files to be transmitted normally by the first transmission device, thereby ensuring the integrity of data transmission and avoiding leaving out important multimedia data.

With the embodiment of the present application, the first transmission device located in the first network obtains the multimedia file descriptor and the multimedia file to be transmitted which have a correspondence, wherein the multimedia file descriptor and the multimedia file are stored in different memories; the multimedia file descriptor and the multimedia file which have a correspondence are encoded into a multimedia transmission file in a first format according to a predetermined rule, so as to overcome the problem of unsynchronized transmission due to separate transmission in related arts. In addition, the multimedia file descriptor and the multimedia file are converted according to the first format as agreed by both sides, wherein the first format is unknown to the third party platform, thereby avoiding the problem of multimedia data leakage resulting from the multimedia data being obtained by the third party platform and then ensuring the security and confidentiality of multimedia data transmission.

As an optional solution, the obtaining unit 802 includes:

1) a first obtaining module used for obtaining the multimedia file descriptor from the head of the transmission queue provided in the first transmission device;

2) a second obtaining module used for obtaining the multimedia file from a device in which the multimedia file is stored, which device is indicated by the multimedia file address in the obtained multimedia file descriptor.

Optionally, in this embodiment, the above multimedia file descriptor may, but is not limited to, be stored on the head of the transmission queue according to a time sequence, thereby ensuring that transmission may be executed successively according to the time sequence when transmitting the multimedia data, and then avoiding the problem of leaving out data during the data transmission process. Here, the above multimedia file descriptor may be, but is not limited to, the multimedia file address used to indicate a device in which the multimedia file is stored.

In the embodiment provided by the present application, the multimedia file descriptor is obtained from the head of a transmission queue and the multimedia file is obtained from the multimedia file address in the obtained multimedia file descriptor such that the multimedia file descriptor and the multimedia file to be transmitted are encoded into a multimedia transmission file in a first format.

As an optional solution, the device further includes:

1) a third obtaining module used for importing the multimedia file descriptor obtained in real time into a temporary data table before obtaining the multimedia file descriptor from the head of the transmission queue provided in the first transmission device;

2) a fourth obtaining module used for obtaining the latest multimedia file descriptor from the temporary data table;

3) a first inserting module used for inserting the obtained latest multimedia file descriptor into the head of the transmission queue.

It should be noted that in this embodiment, the above temporary data table may, but is not limited to, be used to cache the latest multimedia file descriptor, such that the first transmission device inserts the latest multimedia file descriptor obtained from the temporary data table into the head of the transmission queue, thereby the multimedia file descriptor obtained each time from the head of the transmission queue by the first transmission device is the latest one after updating.

Specifically, illustration is made in connection with the following example. Firstly, a temporary passing vehicle table is established in the database of the video network. As shown in steps S402-S412 in FIG. 4, the passing vehicle data obtained in real time is imported into the temporary passing vehicle table, the latest passing vehicle data is obtained from the temporary passing vehicle table and then the obtained data is deleted through a service for exporting data of the video network, and the passing vehicle data is inserted into the head of the transmission queue. Subsequently, the passing vehicle data is obtained from the head of the transmission queue, the passing vehicle pictures are downloaded from a picture server indicated by the passing vehicle data for storing the passing vehicle pictures and the content of the passing vehicle data and the content of the passing vehicle pictures are encoded into a passing vehicle data file in the first format according to the predetermined rule. Further, determine whether format conversion of all the data in the temporary passing vehicle table is completed. If the conversion is completed, then step S412 is executed and the above passing vehicle data is transmitted to the private network; if not, the step S404 is executed again.

In the embodiment provided by the present application, the latest multimedia file descriptor after updating is obtained via the temporary data table, thereby ensuring the multimedia data is inserted to the head of the transmission queue in real time.

As an optional solution, the sending unit includes:

1) a first sending module used for sending the multimedia transmission file to the second transmission device located in the second network through the third party ferrying device; or 2) a second sending module used for sending the multimedia transmission file to the second transmission device through a firewall device;

wherein, the third party ferrying device or the firewall device is used to provide a security border between the first network and the second network.

For example, the above firewall device may be, but is not limited to, a firewall at the security border as shown in FIG. 3. The above third party ferrying device may, but is not limited to, include the above firewall device and the FTP servers located at the security border between the first network and the second network.

With the embodiment provided by the present application, the multimedia transmission file in the first network is sent to the second transmission device in the second network through a third party ferrying device or a firewall device, thereby avoiding the problem of multimedia data leakage resulting from the third party platform obtaining the multimedia data, thus ensuring the security and confidentiality of multimedia data transmission.

As an optional solution, the device further includes:

1) a second inserting module used for, after the first transmission device sends the multimedia transmission file to the second transmission device located in the second network, inserting the multimedia file descriptor to the end of the transmission queue if the first transmission device does not receive a response message sent by the second transmission device within a predetermined time period indicating successful reception of the multimedia transmission file, or if the first transmission device receives a response message sent by the second transmission device within a predetermined time period indicating failure in receiving the multimedia transmission file;

2) a third inserting module used for inserting the multimedia file descriptor to the end of the transmission queue when the first transmission device fails to obtain the multimedia file.

It should be noted that in this embodiment, after the first transmission device sends the multimedia transmission file to the second transmission device located in the second network, the situation in which the sending fails may occur, but it is not limited thereto. In this situation, it is possible to, but is not limited to, insert the unsuccessfully-sent multimedia file descriptor to the end of the transmission queue. Here, the multimedia file descriptor may include, but is not limited to, at least one of the followings: the first transmission device does not receive a response message sent by the second transmission device within a predetermined time period indicating successful reception of the multimedia transmission file; the first transmission device receives a response message sent by the second transmission device within a predetermined time period indicating failure in receiving the multimedia transmission file.

With the embodiment provided by the present application, the unsuccessfully-obtained multimedia file is inserted to the end of the transmission queue, thereby the unsuccessfully-transmitted file is re-transmitted, thus ensuring the integrity of data transmission and avoiding leaving out important multimedia data.

Embodiment 5

In this embodiment, a multimedia data transmission device is further provided, which is used to implement the above embodiments and preferable implementations, and the contents that have been illustrated are not repeated. As used below, the term "module" may be combinations of software and/or hardware that can achieve predetermined functions. Although the devices described in the embodiments below are preferably implemented by means of software, it is conceivable that it is implemented by means of hardware or a combination of software and hardware.

Figure 9:
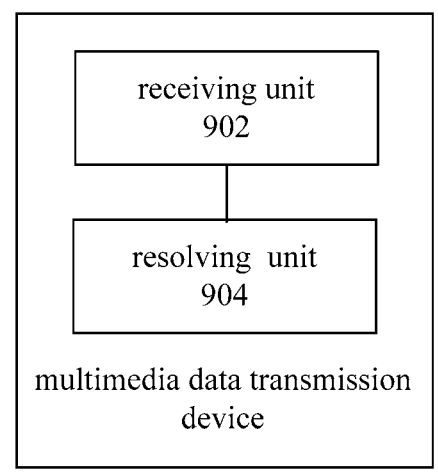
FIG. 9 is a schematic view of another optional multimedia data transmission device according to an embodiment of the present application.

According to an embodiment of the present application, a multimedia data transmission device for implementing the above multimedia data transmission method is further provided, which is a second transmission device located in a second network. As shown in FIG. 9, the device includes:

1) a receiving unit 902 used for receiving a multimedia transmission file in a first format sent by a first transmission device located in a first network, wherein the multimedia transmission file is obtained by encoding a multimedia file descriptor and a multimedia file which have a correspondence according to a predetermined rule;

2) a resolving unit 904 used for resolving the multimedia transmission file according to a predetermined rule to obtain the multimedia file descriptor and the multimedia file and uploading the multimedia file descriptor and the multimedia file to different memories respectively.

Optionally, in this embodiment, the above multimedia data transmission method may be applied to, but is not limited to, a monitor and transmission system for passing vehicles, thereby achieving the transmission of the data of the passing vehicles monitored by a video network to a private network. Here, the above multimedia file descriptor may include, but is not limited to, identification data by monitoring, such as passing vehicle data. The above multimedia file may include, but is not limited to, an identification picture by monitoring, such as a process picture. The above first network and second network may be, but are not limited to, a video network and a private network. The above first transmission device and the second transmission device may be, but are not limited to, FTP picture manage servers. The above is only an example, to which this embodiment is not limited.

It should be noted that in this embodiment, the process of transmitting a file in the video network 102 to the private network 106 through a border (a third party platform) may also be referred to as ferrying.

As shown in FIG. 3, in this embodiment, the above system includes a video network 102 and a corresponding video network platform 104, a private network 106 and a corresponding private network platform 108. In the above system, FTP picture manage servers 302 are provided at the borders close to the video network 102 and the private network 106 respectively. The passing vehicle data monitored by the video network 102 and corresponding passing vehicle pictures downloaded from the PMS are encoded into a multimedia transmission file in a first format according to a predetermined rule by means of a service for exporting passing vehicle data. The multimedia transmission file in the first format is ferried to the FTP picture manage server 302 of the private network 106 by ferrying at the borders of the video network 102 and the private network 106, such that the multimedia transmission file in the first format is read directly within the private network 106 through a data importing service, and the file information therein, i.e. the multimedia file descriptor and the multimedia file (e.g. passing vehicle data and passing vehicle pictures), are obtained by resolving according to a predetermined rule. Thereby the problem that data cannot be transmitted synchronously in the multimedia data transmission methods in related arts is overcome, such that the multimedia file descriptor and the multimedia file monitored by the first transmission device in the first network are transmitted synchronously to the second transmission device in the second network, thereby achieving the objective of transmitting the monitored data synchronously.

In addition, since the predetermined rule is unknown to the third part platform (such as the border), the transmitted files cannot be resolved correctly by the third party platform. Therefore, the multimedia file descriptor and the multimedia file obtained synchronously are uploaded to the private network platform 108 at the same time by the second transmission device in the second network, thereby ensuring the security and confidentiality of multimedia data transmission.

It should be noted that in this embodiment, since the multimedia file descriptor and the multimedia file in related arts need to be ferried to the private network from different servers respectively, the problem that multimedia data cannot be transmitted synchronously during ferrying will occur. In order to solve the above problem, the multimedia data transmission method provided in this embodiment can include, but is not limited to, encoding the multimedia file descriptor and the multimedia file which have a correspondence into the multimedia transmission file in the first format according to the predetermined rule, so as to overcome the problem that data cannot be transmitted synchronously due to separate transmission in related arts. In addition, since a third party platform is required for ferrying, the security and confidentiality of multimedia data transmission is impaired. However, in this embodiment, the multimedia file descriptor and the multimedia file are converted according to the first format as agreed by both sides, wherein the first format is unknown to the third party platform, thereby avoiding the problem of multimedia data leakage resulting from the multimedia data being obtained by the third party platform and then ensuring the security and confidentiality of multimedia data transmission.

Optionally, in this embodiment, the aforesaid first format may be, but is not limited to, a JPEG format. Taking passing vehicle data and passing vehicle pictures as the examples of the multimedia file descriptor and the multimedia file, in the present embodiment, the passing vehicle data and passing vehicle pictures of the video network are written into a file suffixed by JPEG according to certain rules and this file is ferried to the private network for resolving by the private network according to the predetermined rule, thereby obtaining the passing vehicle data and picture for being uploaded to the private network platform. Thus, the problem that passing vehicle data and passing vehicle pictures cannot be ferried (transmitted) synchronously in prior arts, and the problem of information security and confidentiality and the like are overcome.

Optionally, in this embodiment, the second transmission device located in the second network receiving the multimedia transmission file in the first format sent by the first transmission device in the first network includes: S1, the second transmission device storing the multimedia transmission file into a local shared folder after receiving the multimedia transmission file sent by the first transmission device.

It should be noted that in this embodiment, by storing the multimedia transmission file into the shared folder, the second transmission device in the second network can obtain the multimedia transmission file directly from the shared folder rapidly, thereby achieving the effects of improving the efficiency for obtaining the multimedia transmission file and reducing obtaining time.

Optionally, in this embodiment, the second transmission device located in the second network receiving the multimedia transmission file in the first format sent by the first transmission device in the first network further includes: S1, after it is found out that a new multimedia transmission file is stored in the shared folder, the second transmission device obtaining the newly stored multimedia transmission file from the shared folder and storing it into an intermediate folder located locally.

It should be noted that in this embodiment, the new multimedia transmission file obtained in the shared folder is stored in the intermediate folder located locally, which ensures the stability of obtaining the multimedia transmission file each time and avoiding influence on the multimedia transmission file due to real-time variations of the shared folder, thus ensuring the accuracy of the obtained multimedia transmission file. In addition, it is also possible to prevent rescanning in the shared folder to avoid the problem of blocking data upload, thereby achieving the effects of improving the maintainability and expandability of a docking program.

Optionally, in this embodiment the second transmission device resolving the multimedia transmission file according to the predetermined rule to obtain the multimedia file descriptor and the multimedia file and uploading the multimedia file descriptor and the multimedia file to different memories respectively includes:

S1, the second transmission device obtaining the multimedia transmission file from the shared folder or the intermediate folder and resolving the multimedia transmission file according to the predetermined rule to obtain the multimedia file descriptor and the multimedia file; the second transmission device storing the multimedia file descriptor to an uploading queue and a first database located locally; the second transmission device obtaining the multimedia file descriptor from the uploading queue and obtaining the corresponding multimedia file according to this multimedia file descriptor; the second transmission device uploading the multimedia file descriptor and the multimedia file to different memories respectively; or S2, the second transmission device obtaining the multimedia transmission file from the shared folder or the intermediate folder; the second transmission device storing the multimedia transmission file to an uploading queue located locally; the second transmission device obtaining the multimedia transmission file from the uploading queue and resolving the multimedia transmission file according to the predetermined rule to obtain the multimedia file descriptor and the multimedia file; the second transmission device storing the multimedia file descriptor to a first data base located locally; the second transmission device uploading the multimedia file descriptor and the multimedia file to different memories respectively.

Optionally, when the second transmission device resolves the multimedia transmission file according to the predetermined rule to obtain the multimedia file descriptor and the multimedia file and stores the multimedia file descriptor to an uploading queue and a first database located locally, the obtained multimedia file may be stored into the shared folder or the intermediate folder, and after obtaining the multimedia file descriptor from the uploading queue, the second transmission device then obtains corresponding multimedia file from the shared folder or the intermediate folder.

Optionally, in this embodiment, if the second transmission device uploads the multimedia file descriptor and the multimedia file successfully, then the state identifier of the multimedia file descriptor in the first database is set as a success state; if the second transmission device fails to upload the multimedia file descriptor or the multimedia file, then the state identifier of the multimedia file descriptor in the first database is set as a failure state.

It should be noted that in this embodiment, for the multimedia file descriptor in the first database with a failure state identifier, the following steps may be executed, without being limited thereto:

S1, inquiring whether there is a multimedia file descriptor with a failure state identifier in the first database;

S2, if so, then the second transmission device obtaining the multimedia file descriptor with a failure state identifier, and/or obtaining the multimedia file corresponding to the multimedia file descriptor and re-uploading the multimedia file descriptor and/or the multimedia file which have been uploaded unsuccessfully.

Optionally, in this embodiment, after obtaining the multimedia file descriptor with a failure state identifier, the second transmission device will, according to the multimedia file descriptor, obtain the corresponding multimedia file from the shared folder or the intermediate folder for re-upload, or, obtain the corresponding multimedia transmission file from the shared folder or the intermediate folder and obtain the corresponding multimedia file by resolving the multimedia transmission file for re-upload.

Moreover, in this embodiment, for the multimedia file descriptor in the first database with a success state identifier, the following steps may be executed, without being limited thereto:

S1, inquiring whether there is a multimedia file descriptor with a success state identifier in the first database;

S2, if so, the second transmission device deleting the multimedia file descriptor with a success state identifier in the first database.

Optionally, in this embodiment, while deleting the multimedia file descriptor with a success state identifier in the first database, the second transmission device also deletes the corresponding multimedia transmission file in the shared folder or the intermediate folder and/or the corresponding multimedia file.

With the embodiment provided by the present application, a second transmission device located in a second network receives a multimedia transmission in a first format sent by a first transmission device located in a first network, wherein the multimedia transmission file is obtained by encoding content of multimedia file descriptor and content of a multimedia file which have a correspondence according to a predetermined rule; the second transmission device resolves the multimedia transmission file according to a predetermined rule to obtain the multimedia file descriptor and the multimedia file and uploads the multimedia file descriptor and the multimedia file to different memories respectively. That is, the multimedia file descriptor and the multimedia file in the first network, which would otherwise to be ferried from different servers to the second network respectively are encoded into a multimedia transmission file in the first format according to the first format for transmission, such that it can be resolved by the second transmission device located in the second network according to the first format to obtain the multimedia file descriptor and the multimedia file, thereby overcoming the problem that multimedia data cannot be transmitted synchronously during ferrying in related arts, and thus achieving synchronous resolving of the multimedia transmission file in the first format transmitted synchronously. In addition, the multimedia file descriptor and the multimedia file are converted according to the first format as agreed by both sides, wherein the first format is unknown to the third party platform, thereby avoiding the problem of multimedia data leakage resulting from the multimedia data being obtained by the third party platform and then ensuring the security and confidentiality of multimedia data transmission.

As an optional solution, the receiving unit 902 includes:

1) a first storing module used for, after receiving the multimedia transmission file sent by the first transmission device, storing the multimedia transmission file to a local shared folder.

Optionally, in this embodiment, the above local shared folder is used to share files with the second transmission device in the second network such that each second transmission device in the second network may access and obtain the multimedia transmission file.

Optionally, in this embodiment, it is possible to look up the multimedia transmission file in the local shared folder and the multimedia transmission file found is resolved according to the predetermined rule to obtain the passing vehicle data and the passing vehicle pictures. In this way, each second transmission device in the second network obtains the multimedia transmission file directly from the shared folder rapidly, thereby achieving the effects of improving the efficiency for obtaining the multimedia transmission file and reducing obtaining time.

In the embodiment provided by the present application, the multimedia transmission file is obtained from the local shared folder, so as to obtain the multimedia transmission file directly and rapidly, thus achieving the effects of improving the efficiency of obtaining the multimedia transmission file and reducing the obtaining time.

As an optional solution, the receiving unit 902 includes:

1) a second storing module used for, after it is found out that a new multimedia transmission file is stored in the shared folder, obtaining the newly stored multimedia transmission file from the shared folder and storing it into an intermediate folder located locally.

Illustration is made in connection with the following example. As in steps S602-S610 shown in FIG. 6, if it is determined that the local shared folder is not empty, then step S604 of reading the multimedia transmission file in the local shared folder is performed, and then step S606 of transferring the read multimedia transmission file from the shared folder to the intermediate folder is performed. Further, steps S608-S610 are executed, performed, which are inserting the multimedia transmission file to a local database and uploading it to the uploading queue.

In the embodiment provided by the present application, the new multimedia file obtained in the shared folder is stored in the intermediate folder located locally, which ensures the stability of obtaining the multimedia transmission file each time and avoiding influence on the multimedia transmission file due to real-time variations of the shared folder, thus ensuring the accuracy of the obtained multimedia transmission file. In addition, it is also possible to prevent rescanning in the shared folder to avoid the problem of blocking data upload, thereby achieving the effect of improving maintainability and expandability of a docking program.

As an optional solution, the second transmission device performs the following steps to resolve the multimedia transmission file according to the predetermined rule to obtain the multimedia file descriptor and the multimedia file and to upload the multimedia file descriptor and the multimedia file to different memories respectively:

S1, obtaining the multimedia transmission file from the shared folder or the intermediate folder and resolving the multimedia transmission file according to the predetermined rule to obtain the multimedia file descriptor and the multimedia file; storing the multimedia file descriptor into an uploading queue and a first database located locally; obtaining the multimedia file descriptor from the uploading queue and obtaining the corresponding multimedia file according to this multimedia file descriptor; uploading the multimedia file descriptor and the multimedia file to different memories respectively; or S2, obtaining the multimedia transmission file from the shared folder or the intermediate folder; storing the multimedia transmission file into an uploading queue located locally; the second transmission device obtaining the multimedia transmission file from the uploading queue and resolving the multimedia transmission file according to the predetermined rule to obtain the multimedia file descriptor and the multimedia file; storing the multimedia file descriptor into a first data base located locally; the second transmission device uploading the multimedia file descriptor and the multimedia file to different memories respectively.

Optionally, in this embodiment, the second transmission device may, after obtaining the multimedia transmission file from the shared folder or the intermediate folder, obtain the multimedia file descriptor and the multimedia file by resolving the multimedia transmission file and then stores the same into the uploading queue and first database located locally; it may also stores the multimedia transmission file directly into the uploading queue located locally, and then stores the multimedia file descriptor into the first database located locally after obtaining the multimedia file descriptor and the multimedia file by resolving the multimedia transmission file. This embodiment is not limited to the above.

Illustration is made in connection with the following example. As in steps S702-S708 shown in FIG. 7, the multimedia file descriptor to be re-uploaded is obtained from the local database, the obtained multimedia file descriptor is inserted to the end of the uploading queue (in order to ensure that new data is processed firstly, the insertion is done only when the amount of data in the sending queue is less than half of the upper limit of the queue), the state identifier of the multimedia file descriptor in the local database is set to be a sending state, and the multimedia file is re-uploaded to a multimedia server when the position of the multimedia file descriptor is changed from the end to the head of the uploading queue. The re-upload strategy ensures that the time delay of each re-upload is increased nonlinearly, for example, the first six re-uploads occur within one hour and the last re-upload occurs on the fifth day.

In the embodiments provided by the present application, the multimedia file descriptor to be re-uploaded is inserted to the uploading queue and the multimedia file descriptor, the multimedia file are stored into different memories respectively, thereby the unsuccessfully-sent multimedia file can be re-uploaded, thus ensuring the integrity of data transmission and avoiding leaving out important multimedia data.

As an optional solution, the above device further includes:

1) a setting module used for setting the state identifier of the multimedia file descriptor in the first database as a success state if the multimedia file descriptor and the multimedia file are uploaded successfully; setting the state identifier of the multimedia file descriptor in the first database as a failure state if the multimedia file descriptor or the multimedia file are not uploaded successfully.

As an optional implementation, for the multimedia file descriptor in the first database with a failure state identifier, the above device may include, but not limited to:

1) a first inquiring unit used for inquiring whether there is a multimedia file descriptor with a failure state identifier in the first database;

2) a re-uploading unit used for, when there is a multimedia file descriptor with a failure state identifier, obtaining the multimedia file descriptor with a failure state identifier, and/or obtaining the multimedia file corresponding to the multimedia file descriptor and re-uploading the multimedia file descriptor and/or the multimedia file which have been uploaded unsuccessfully.

Optionally, in this embodiment, time interval between two adjacent re-uploading may be in, but is not limited to, the form of nonlinear growth.

As an optional implementation, for the multimedia file descriptor in the first database with a success state identifier, the above device may include, but not limited to:

1) a second inquiring unit used for inquiring whether there is a multimedia file descriptor with a success state identifier in the first database;

2) a deleting unit used for, when there is a multimedia file descriptor with a success state identifier in the first database, deleting the multimedia file descriptor with a success state identifier in the first database.

Optionally, in this embodiment, the ways of deleting the multimedia file descriptor may be, but is not limited to, at least one of the followings: deleting the multimedia file descriptors within a predetermined time period, deleting the multimedia file descriptors when the remaining disk capacity of the second transmission device is smaller than a predetermined threshold. Here, after one deletion is completed, it is also possible to reset a deleting state when a predetermined condition (e.g. reaching a predetermined moment or the remaining disk capacity is greater than a predetermined threshold) is satisfied, but the embodiment is not limited thereto.

For example, if the first threshold is 20% and the second threshold is 60%, then when the remaining disk capacity is smaller than 20%, deletion is executed until the remaining disk capacity is greater than 60%.

For another example, it is found by inquiry that the number of deletable multimedia file descriptors in the database at the current moment is m; then in this example, the earliest m multimedia file descriptors can be deleted along with the corresponding picture files.

It should be noted that in this embodiment, for the multimedia file descriptor in the first database with a failure state identifier, it is possible to, but not limited to, re-upload at least one type of the following information: the multimedia file descriptor or multimedia file which have been uploaded unsuccessfully. That is, either the multimedia file descriptor or the multimedia file may fail to be uploaded and therefore. When a failure state is determined, re-upload is performed to ensure the integrity of data transmission and avoid leaving out important multimedia data. In addition, for a multimedia file descriptor in the first database with a success state identifier, it is possible to delete the corresponding multimedia file descriptor, but the embodiment is not limited thereto.

With the embodiment provided by the present application, for multimedia file descriptors in the first database with a success state identifier and a failure state identifier, different steps are executed respectively. In the case of successful upload of the multimedia file descriptor and multimedia file, corresponding contents are deleted timely, so as to avoid occupying too much storage space. In the case of unsuccessful upload of the multimedia file descriptor or the multimedia file, re-upload is performed timely, so as to avoid leaving out data.

As an optional solution, the above re-uploading unit includes:

1) an obtaining module used for obtaining the multimedia file descriptor from the first database; and/or obtaining multimedia file corresponding to the multimedia file descriptor from the shared folder or the intermediate folder;

2) an inserting module used for inserting the obtained multimedia file descriptor and/or multimedia file to the end of the uploading queue;

3) a re-uploading module used for re-uploading the multimedia file descriptor and/or multimedia file to corresponding memories when the position of the multimedia file descriptor and/or multimedia file changes from the end to the head of the uploading queue.

With the embodiment provided by the present application, for a multimedia file descriptor with a failure state identifier, the multimedia file descriptor is obtained from the first database again, and/or the multimedia file corresponding to the multimedia file descriptor is obtained from the shared folder or the intermediate folder, the multimedia file descriptor and/or the multimedia file is inserted to the end of the uploading queue, so as to re-upload the multimedia file descriptor and/or the multimedia file to corresponding memories when the position of the multimedia file descriptor and/or the multimedia file is changed from the end to the head of the uploading queue, thereby achieving timely re-upload of the content which have been uploaded unsuccessfully.

As an optional solution, the deleting unit includes:

1) a deleting module used for, when the remaining storage capacity of the second transmission device is smaller than a first threshold and the current time is within a predetermined time period, deleting the multimedia file descriptor with a success state identifier in the first database until the current time is beyond the predetermined time period or until the remaining storage capacity is larger than a second threshold, wherein the second threshold is greater than the first threshold.

With the embodiment provided by the present application, for the multimedia file descriptor with the success state identifier, multimedia file descriptor is deleted according to a predetermined condition, thereby ensuring enough storage space.

Embodiment 6

According to embodiments of the present application, an electronic apparatus is provided, the electronic apparatus including:

a processor, a memory, communication interfaces and a bus;

the processor, the memory and the communication interfaces connecting to and communicating with each other by the bus;

the memory being stored with executable program codes;

the processor executing the program corresponding to the executable program codes by reading the executable program codes stored in the memory, so as to perform the multimedia transmission methods provided by embodiments of the present application.

In a specific implementation of the present application, the above multimedia data transmission method includes:

a first transmission device located in a first network obtaining a multimedia file descriptor and a multimedia file to be transmitted which have a correspondence, wherein the multimedia file descriptor and the multimedia file are stored in different memories;

the first transmission device encoding content of the multimedia file descriptor and content of the multimedia file into a multimedia transmission file in a first format according to a predetermined rule;

the first transmission device sending the multimedia transmission file to a second transmission device located in a second network.

In another specific implementation of the present application, the above multimedia data transmission method includes:

a second transmission device located in a second network receiving a multimedia transmission file in a first format sent by a first transmission device located in a first network, wherein the multimedia transmission file is obtained by encoding, according to a predetermined rule, a multimedia file descriptor and a multimedia file which have a correspondence;

the second transmission device resolving the multimedia transmission file according to a predetermined rule to obtain the multimedia file descriptor and the multimedia file and uploading the multimedia file descriptor and the multimedia file to different memories respectively.

In another specific implementation of the present application, the above multimedia data transmission method includes:

a first transmission device located in a first network obtaining a multimedia file descriptor and a multimedia file to be transmitted which have a correspondence, wherein the multimedia file descriptor and the multimedia file are stored in different memories; the first transmission device encoding content of the multimedia file descriptor and content of the multimedia file into a multimedia transmission file in a first format according to a predetermined rule;

the first transmission device sending the multimedia transmission file to a second transmission device located in a second network;

the second transmission device located in the second network receiving the multimedia transmission file in the first format sent by the first transmission device located in the first network, wherein the multimedia transmission file is obtained by encoding, according to a predetermined rule, the multimedia file descriptor and the multimedia file which have a correspondence;

the second transmission device resolving the multimedia transmission file to obtain the multimedia file descriptor and the multimedia file according to the predetermined rule and uploading the multimedia file descriptor and the multimedia file to different memories respectively.

It should be noted that the electronic apparatus exists in many forms, including but not limited to:

(1) a mobile communication device: such a device is characterized in that it has a mobile communication function and essentially aims at providing voice, data communication. Such devices include: smart phones (e.g. iPhone), multimedia cellphones, functional cellphones, and low-end cellphones.

(2) an ultra-mobile personal computer device: such a device belongs to personal computers, which has computing and processing functions and generally has mobile internet function. Such terminals include: PDA, MID and UMPC devices and the like, such as iPad.

(3) a portable entertainment device: such a device may display and play multimedia contents. Such devices include: audio, video players (e.g. iPod), handheld game consoles, e-book readers and intelligent toys and portable on-board navigation devices.

(4) a server: a device providing computing services, which consists of a processor, hardware, memories, a system bus and the like. The architecture of a server is similar with that of a general computer, but has higher requirements on process capacity, stability, reliability, security, expandability, manageability and so on since highly reliable services are required to be provided.

(5) Other electronic apparatus with data interaction function.

With the electronic apparatus provided by the present application, the first transmission device located in the first network obtains the multimedia file descriptor and the multimedia file which have a correspondence, wherein the multimedia file descriptor and the multimedia file are stored in different memories; the multimedia file descriptor and the multimedia file which have a correspondence are encoded into a multimedia transmission file in a first format according to a predetermined rule to overcome the problem of unsynchronized transmission due to separate transmission in related arts.

Further, the multimedia file descriptor and the multimedia file are converted according to the first format as agreed by both sides, wherein the first format is unknown to the third party platform, thereby avoiding the problem of multimedia data leakage resulting from the multimedia data being obtained by the third party platform and then ensuring the security and confidentiality of multimedia data transmission.

Embodiment 7

According to an embodiment of the present application, an application program is provided, which is used for performing the multimedia transmission method provided by embodiments of the present application when executed.

In a specific implementation of the present application, the above multimedia data transmission method includes:

a first transmission device located in a first network obtaining a multimedia file descriptor and a multimedia file to be transmitted which have a correspondence, wherein the multimedia file descriptor and the multimedia file are stored in different memories;

the first transmission device encoding content of the multimedia file descriptor and content of the multimedia file into a multimedia transmission file in a first format according to a predetermined rule;

the first transmission device sending the multimedia transmission file to a second transmission device located in a second network.

In another specific implementation of the present application, the above multimedia data transmission method includes:

a second transmission device located in a second network receiving a multimedia transmission file in a first format sent by a first transmission device located in a first network, wherein the multimedia transmission file is obtained by encoding, according to a predetermined rule, a multimedia file descriptor and a multimedia file which have a correspondence;

the second transmission device resolving the multimedia transmission file according to a predetermined rule to obtain the multimedia file descriptor and the multimedia file and uploading the multimedia file descriptor and the multimedia file to different memories respectively.

In another specific implementation of the present application, the above multimedia data transmission method includes:

a first transmission device located in a first network obtaining a multimedia file descriptor and a multimedia file to be transmitted which have a correspondence, wherein the multimedia file descriptor and the multimedia file are stored in different memories;

the first transmission device encoding content of the multimedia file descriptor and content of the multimedia file into a multimedia transmission file in a first format according to a predetermined rule;

the first transmission device sending the multimedia transmission file to a second transmission device located in a second network;

the second transmission device located in the second network receiving the multimedia transmission file in the first format sent by the first transmission device located in the first network, wherein the multimedia transmission file is obtained by encoding, according to a predetermined rule, the multimedia file descriptor and the multimedia file which have a correspondence;

the second transmission device resolving the multimedia transmission file to obtain the multimedia file descriptor and the multimedia file according to the predetermined rule and uploading the multimedia file descriptor and the multimedia file to different memories respectively.

By executing the application program provided by the present application, the first transmission device located in the first network obtains the multimedia file descriptor and the multimedia file which have a correspondence, wherein the multimedia file descriptor and the multimedia file are stored in different memories; the multimedia file descriptor and the multimedia file which have a correspondence are encoded into a multimedia transmission file in a first format according to a predetermined rule to overcome the problem of unsynchronized transmission due to separate transmission in related arts.

Further, the multimedia file descriptor and the multimedia file are converted according to the first format as agreed by both sides, wherein the first format is unknown to the third party platform, thereby avoiding the problem of multimedia data leakage resulting from the multimedia data being obtained by the third party platform and then ensuring the security and confidentiality of multimedia data transmission.

Embodiment 8

According to an embodiment of the present application, a storage medium is provided, which is used for storing an application program for performing the multimedia data transmission method provided by embodiments of the present application when executed.

In a specific implementation of the present application, the above multimedia data transmission method includes:

a first transmission device located in a first network obtaining a multimedia file descriptor and a multimedia file to be transmitted which have a correspondence, wherein the multimedia file descriptor and the multimedia file are stored in different memories;

the first transmission device encoding content of the multimedia file descriptor and content of the multimedia file into a multimedia transmission file in a first format according to a predetermined rule;

the first transmission device sending the multimedia transmission file to a second transmission device located in a second network.

In another specific implementation of the present application, the above multimedia data transmission method includes:

a second transmission device located in a second network receiving a multimedia transmission file in a first format sent by a first transmission device located in a first network, wherein the multimedia transmission file is obtained by encoding, according to a predetermined rule, a multimedia file descriptor and a multimedia file which have a correspondence;

the second transmission device resolving the multimedia transmission file according to a predetermined rule to obtain the multimedia file descriptor and the multimedia file and uploading the multimedia file descriptor and the multimedia file to different memories respectively.

In another specific implementation of the present application, the above multimedia data transmission method includes:

a first transmission device located in a first network obtaining a multimedia file descriptor and a multimedia file to be transmitted which have a correspondence, wherein the multimedia file descriptor and the multimedia file are stored in different memories;

the first transmission device encoding content of the multimedia file descriptor and content of the multimedia file into a multimedia transmission file in a first format according to a predetermined rule;

the first transmission device sending the multimedia transmission file to a second transmission device located in a second network;

the second transmission device located in the second network receiving the multimedia transmission file in the first format sent by the first transmission device located in the first network, wherein the multimedia transmission file is obtained by encoding, according to a predetermined rule, the multimedia file descriptor and the multimedia file which have a correspondence;

the second transmission device resolving the multimedia transmission file to obtain the multimedia file descriptor and the multimedia file according to the predetermined rule and uploading the multimedia file descriptor and the multimedia file to different memories respectively.

By executing the application program stored in the storage medium provided by the present application, the first transmission device located in the first network obtains the multimedia file descriptor and the multimedia file which have a correspondence, wherein the multimedia file descriptor and the multimedia file are stored in different memories; the multimedia file descriptor and the multimedia file which have a correspondence are encoded into a multimedia transmission file in a first format according to a predetermined rule to overcome the problem of unsynchronized transmission due to separate transmission in related arts.

Further, the multimedia file descriptor and the multimedia file are converted according to the first format as agreed by both sides, wherein the first format is unknown to the third party platform, thereby avoiding the problem of multimedia data leakage resulting from the multimedia data being obtained by the third party platform and then ensuring the security and confidentiality of multimedia data transmission.

The serial number of the above embodiments of the present application is only for descriptive purpose and is not representative of the merit of embodiments.

In the above embodiments of the present application, particular emphasis is placed on respective embodiment, and for the part that is not described in detail in an embodiment, reference may be made to related descriptions of other embodiments.

In several embodiments provided by the present application, it should be understood that the disclosed technical contents may be implemented by other ways. Herein, the device embodiments described above are only schematic. For example, it may be divided into units according to logical functions and in practical implementation may be divided in other ways. For example, a plurality of units or components may be combined or may be integrated into another system, or some features may be omitted or may not be executed. In another point, the displayed or discussed mutual couplings or direct couplings or communication connections may be indirect couplings or communication connections of units or modules via a number of interfaces and may be electrical or in other ways.

The units that are illustrated as separate components may be or may not be separate physically, and the components displayed as units may or may not be physical units, i.e. may be located in one and the same location or may also be distributed to multiple units. Part of or all of the units may be selected to implement the objectives of the present embodiments according to practical requirements.

In addition, each functional unit in each embodiment of the present application may be integrated into one processing unit and may be one separate physical unit, or two or more units may be integrated into one unit. The above integrated unit may be implemented in hardware manners as well as in software functional unit manners.

The above integrated unit may be stored in a computer readable storage medium if it is implemented in software functional unit manners and sold or used as a separate product. Based on such understanding, essential parts or parts that contribute to the prior art of technical solutions of the present application or part or all of these technical solutions may be embodied in the manner of software product which is stored in storage medium and includes a number of instructions by which a computer device (which may be a personal computer, a server or a network device or the like) executes part or all of the steps of the methods described by various embodiments the present application. The above storage medium includes various mediums that may store program codes such as a U disk, a read only memory (ROM), a random access memory (RAM), a mobile hard disk, a magnetic disk or an optical disk or the like.

The above description is only for preferable embodiments of the present application and it is noted that one of ordinary skill in the art may make numerous improvements and modifications that should fall in the protections scope of the present application without departing from the principle of the present application.

What is claimed is:

1. A multimedia data transmission method, wherein, the method comprises:
    a first transmission device located in a first network obtaining a multimedia file descriptor and a multimedia file to be transmitted which have a correspondence, wherein the multimedia file descriptor and the multimedia file are stored in different memories, and wherein, the first transmission device obtains the multimedia file descriptor from the head of a transmission queue provided in the first transmission device, and the first transmission device obtains the multimedia file from a device in which the multimedia file is stored, which device is indicated by a multimedia file address in the obtained multimedia file descriptor;
    the first transmission device encoding content of the multimedia file descriptor and content of the multimedia file into a multimedia transmission file in a first format according to a predetermined rule;
    the first transmission device sending the multimedia transmission file to a second transmission device located in a second network; and
    if the first transmission device does not receive a response message sent by the second transmission device within a predetermined time period indicating successful reception of the multimedia transmission file, or if the first transmission device receives a response message sent by the second transmission device within a predetermined time period indicating failure in receiving the multimedia transmission file, then the first transmission device inserts the multimedia file descriptor to the end of the transmission queue.

2. The method according to claim 1, wherein, before the first transmission device obtains the multimedia file descriptor from the head of the transmission queue provided in the first transmission device, the method further comprises:
    the first transmission device importing the multimedia file descriptor obtained in real time into a temporary data table;
    the first transmission device obtaining a latest multimedia file descriptor from the temporary data table;
    the first transmission device inserting the obtained latest multimedia file descriptor into the head of the transmission queue.

3. The method according to claim 1, wherein, the first transmission device sending the multimedia transmission file to the second transmission device located in the second network comprises:
    the first transmission device sending the multimedia transmission file to the second transmission device located in the second network through a third party ferrying device; or
    the first transmission device sending the multimedia transmission file to the second transmission device through a firewall device;
    wherein, the third party ferrying device or the firewall device is used to provide a security border between the first network and the second network.

4. The method according to claim 1, wherein,
    before the first transmission device sends the multimedia transmission file to the second transmission device located in the second network, the method further comprises: if the first transmission device fails to obtain the multimedia file, then the first transmission device inserting the multimedia file descriptor to the end of the transmission queue.

5. The method according to claim 1, wherein, the multimedia file descriptor comprises monitoring identification data; the multimedia files comprises monitoring identification pictures.

6. A multimedia data transmission method, wherein, the method comprises:

a second transmission device located in a second network receiving a multimedia transmission file in a first format sent by a first transmission device located in a first network, wherein the multimedia transmission file is obtained by encoding, according to a predetermined rule, a multimedia file descriptor and a multimedia file which have a correspondence, wherein, the multimedia file descriptor is obtained by the first transmission device from head of a transmission queue provided in the first transmission device, and the multimedia file is obtained by the first transmission device from a device in which the multimedia file is stored, which device is indicated by a multimedia file address in the obtained multimedia file descriptor;

the second transmission device resolving the multimedia transmission file according to the predetermined rule to obtain the multimedia file descriptor and the multimedia file and uploading the multimedia file descriptor and the multimedia file to different memories respectively;

wherein if the first transmission device does not receive a response message sent by the second transmission device within a predetermined time period indicating successful reception of the multimedia transmission file, or if the first transmission device receives a response message sent by the second transmission device within a predetermined time period indicating failure in receiving the multimedia transmission file, then the first transmission device inserts the multimedia file descriptor to the end of the transmission queue.

7. The method according to claim 6, wherein, the second transmission device located in the second network receiving the multimedia transmission file in the first format sent by the first transmission device located in the first network comprises:

after receiving the multimedia transmission file sent by the first transmission device, the second transmission device storing the multimedia transmission file into a local shared folder.

8. The method according to claim 7, wherein, the second transmission device located in the second network receiving the multimedia transmission file in the first format sent by the first transmission device located in the first network further comprises:

after it is found out that a new multimedia transmission file is stored in the shared folder, the second transmission device obtaining the newly stored multimedia transmission file from the shared folder and storing it into an intermediate folder located locally.

9. The method according to claim 7, wherein, the second transmission device resolving the multimedia transmission file according to the predetermined rule to obtain the multimedia file descriptor and the multimedia file and uploading the multimedia file descriptor and the multimedia file to different memories respectively comprises:

the second transmission device obtaining the multimedia transmission file from the shared folder or the intermediate folder and resolving the multimedia transmission file according to the predetermined rule to obtain the multimedia file descriptor and the multimedia file; the second transmission device storing the multimedia file descriptor to an uploading queue and a first database located locally; the second transmission device obtaining the multimedia file descriptor from the uploading queue and obtaining the corresponding multimedia file according to this multimedia file descriptor; the second transmission device uploading the multimedia file descriptor and the multimedia file to different memories respectively; or the second transmission device obtaining the multimedia transmission file from the shared folder or the intermediate folder; the second transmission device storing the multimedia transmission file to an uploading queue located locally; the second transmission device obtaining the multimedia transmission file from the uploading queue and resolving the multimedia transmission file according to the predetermined rule to obtain the multimedia file descriptor and the multimedia file; the second transmission device storing the multimedia file descriptor into a first data base located locally; the second transmission device uploading the multimedia file descriptor and the multimedia file to different memories respectively.

10. The method according to claim 9, wherein, the method further comprises:

if the second transmission device uploads the multimedia file descriptor and the multimedia file successfully, then setting a state identifier of the multimedia file descriptor in the first database as a success state; if the second transmission device fails to upload the multimedia file descriptor or the multimedia file, then setting the state identifier of the multimedia file descriptor in the first database as a failure state.

11. The method according to claim 10, wherein, the method further comprises:

inquiring whether there is a multimedia file descriptor with a failure state identifier in the first database;

if so, then the second transmission device obtaining the multimedia file descriptor with a failure state identifier, and/or obtaining the multimedia file corresponding to the multimedia file descriptor and re-uploading the multimedia file descriptor and/or the multimedia file which have been uploaded unsuccessfully.

12. The method according to claim 11, wherein, the second transmission device obtaining the multimedia file descriptor with a failure state identifier, and/or obtaining the multimedia file corresponding to the multimedia file descriptor and re-uploading the multimedia file descriptor and/or the multimedia file which have been uploaded unsuccessfully comprises:

the second transmission device obtaining the multimedia file descriptor from the first database; and/or the second transmission device obtaining the multimedia file corresponding to the multimedia file descriptor from the shared folder or the intermediate folder;

the second transmission device inserting the obtained multimedia file descriptor and/or multimedia file to the end of the uploading queue;

the second transmission device re-uploading the multimedia file descriptor and/or multimedia file to corresponding memories when the position of the multimedia file descriptor and/or multimedia file in the uploading queue changes from the end to the head of the uploading queue.

13. The method according to claim 11, wherein, time interval between two adjacent re-uploads for the same multimedia file descriptor and/or multimedia file is in the form of nonlinear growth.

14. The method according to claim 10, wherein, the method further comprises:

inquiring whether there is a multimedia file descriptor with a success state identifier in the first database;

if so, the second transmission device deleting the multimedia file descriptor with a success state identifier in the first database.

15. The method according to claim 14, wherein, the second transmission device deleting the multimedia file descriptor with a success state identifier in the first database comprises:

when a remaining storage capacity of the second transmission device is smaller than a first threshold and the current time is within a predetermined time period, the second transmission device deleting the multimedia file descriptor with a success state identifier in the first database until the current time is beyond the predetermined time period or until the remaining storage capacity is larger than a second threshold, wherein the second threshold is greater than the first threshold.

16. A multimedia data transmission method, wherein the method comprises:

a first transmission device located in a first network obtaining a multimedia file descriptor and a multimedia file to be transmitted which have a correspondence, wherein the multimedia file descriptor and the multimedia file are stored in different memories, and wherein, the first transmission device obtains the multimedia file descriptor from the head of a transmission queue provided in the first transmission device, and the first transmission device obtains the multimedia file from a device in which the multimedia file is stored, which device is indicated by a multimedia file address in the obtained multimedia file descriptor;

the first transmission device encoding content of the multimedia file descriptor and content of the multimedia file into a multimedia transmission file in a first format according to a predetermined rule;

the first transmission device sending the multimedia transmission file to a second transmission device located in a second network;

if the first transmission device does not receive a response message sent by the second transmission device within a predetermined time period indicating successful reception of the multimedia transmission file, or if the first transmission device receives a response message sent by the second transmission device within a predetermined time period indicating failure in receiving the multimedia transmission file, then the first transmission device inserts the multimedia file descriptor to the end of the transmission queue;

the second transmission device located in the second network receiving the multimedia transmission file in the first format sent by the first transmission device located in the first network, wherein the multimedia transmission file is obtained by encoding, according to the predetermined rule, the multimedia file descriptor and the multimedia file which have a correspondence;

the second transmission device resolving the multimedia transmission file to obtain the multimedia file descriptor and the multimedia file according to the predetermined rule and uploading the multimedia file descriptor and the multimedia file to different memories respectively.

17. A multimedia data transmission device, which is located in a first network and comprises a processor, a memory, communication interfaces and a bus;

the processor, the memory and the communication interfaces connecting to and communicating with each other by the bus;

the memory being stored with executable program codes;

the processor executing a program corresponding to the executable program codes by reading the executable program codes stored in the memory, so as to perform the multimedia transmission method according to claim 1.

18. A multimedia data transmission device, which is located in a second network and comprises a process, a memory, communication interfaces and a bus;

the processor, the memory and the communication interfaces connecting to and communicating with each other by the bus;

the memory being stored with executable program codes;

the processor executing a program corresponding to the executable program codes by reading the executable program codes stored in the memory, so as to perform the multimedia transmission method according to claim 6.

19. A storage medium, wherein, the storage medium is used for storing executable program for performing the multimedia data transmission method according to claim 1 when executed.

* * * * *